US012583033B2

(12) United States Patent
    Martinez

(10) Patent No.: US 12,583,033 B2
(45) Date of Patent: Mar. 24, 2026

(54) INTEGRATING ADDITIVELY-MANUFACTURED COMPONENTS

(71) Applicant: Divergent Technologies, Inc., Los Angeles, CA (US)

(72) Inventor: Antonio Martinez, Los Angeles, CA (US)

(73) Assignee: Divergent Technologies, Inc., Los Angeles, CA (US)

( * ) Notice: Subject to any disclaimer, the term of this patent is extended or adjusted under 35 U.S.C. 154(b) by 0 days.

(21) Appl. No.: 17/402,212

(22) Filed: Aug. 13, 2021

(65) Prior Publication Data

US 2023/0051372 A1 Feb. 16, 2023

(51) Int. Cl.

| | |
|---|---|
| *B22F 10/80* | (2021.01) |
| *B22F 10/28* | (2021.01) |
| *B22F 10/60* | (2021.01) |
| *B23K 26/342* | (2014.01) |
| *B33Y 10/00* | (2015.01) |
| *B33Y 50/00* | (2015.01) |
| *B33Y 80/00* | (2015.01) |

(52) U.S. Cl.
    CPC .............. *B22F 10/80* (2021.01); *B22F 10/28* (2021.01); *B22F 10/60* (2021.01); *B33Y 10/00* (2014.12); *B33Y 50/00* (2014.12); *B33Y 80/00* (2014.12); *B23K 26/342* (2015.10)

(58) Field of Classification Search
    CPC .......... B22F 10/80; B22F 10/28; B22F 10/60; B22F 7/062; B22F 10/25; B33Y 10/00; B33Y 50/00; B33Y 80/00; B23K 26/342; Y02P 10/25
    See application file for complete search history.

(56) References Cited

U.S. PATENT DOCUMENTS

| | | | |
|---|---|---|---|
| 5,203,226 | A | 4/1993 | Hongou et al. |
| 5,742,385 | A | 4/1998 | Champa |
| 5,990,444 | A | 11/1999 | Costin |
| 6,010,155 | A | 1/2000 | Rinehart |
| 6,096,249 | A | 8/2000 | Yamaguchi |

(Continued)

FOREIGN PATENT DOCUMENTS

| | | |
|---|---|---|
| WO | 1996036455 A1 | 11/1996 |
| WO | 1996036525 A1 | 11/1996 |

(Continued)

OTHER PUBLICATIONS

US 9,202,136 B2, 12/2015, Schmidt et al. (withdrawn)

(Continued)

*Primary Examiner* — John A Hevey

(74) *Attorney, Agent, or Firm* — ArentFox Schiff LLP

(57) ABSTRACT

Methods for joining components, and apparatuses comprising components to be joined, are described. An apparatus in accordance with an aspect of the present disclosure comprises a first component comprising a first feature having a first surface profile, and an additively-manufactured second component comprising a second feature having a second surface profile, wherein the second surface profile is generated at least in part from the first surface profile of the first interface, such that the first surface profile is configured to mate with the second surface profile.

10 Claims, 11 Drawing Sheets

(56)    References Cited

U.S. PATENT DOCUMENTS

| | | | |
|---|---|---|---|
| 6,140,602 | A | 10/2000 | Costin |
| 6,250,533 | B1 | 6/2001 | Otterbein et al. |
| 6,252,196 | B1 | 6/2001 | Costin et al. |
| 6,318,642 | B1 | 11/2001 | Goenka et al. |
| 6,365,057 | B1 | 4/2002 | Whitehurst et al. |
| 6,391,251 | B1 | 5/2002 | Keicher et al. |
| 6,409,930 | B1 | 6/2002 | Whitehurst et al. |
| 6,468,439 | B1 | 10/2002 | Whitehurst et al. |
| 6,554,345 | B2 | 4/2003 | Jonsson |
| 6,585,151 | B1 | 7/2003 | Ghosh |
| 6,644,721 | B1 | 11/2003 | Miskech et al. |
| 6,811,744 | B2 | 11/2004 | Keicher et al. |
| 6,866,497 | B2 | 3/2005 | Saiki |
| 6,919,035 | B1 | 7/2005 | Clough |
| 6,926,970 | B2 | 8/2005 | James et al. |
| 7,152,292 | B2 | 12/2006 | Hohmann et al. |
| 7,344,186 | B1 | 3/2008 | Hausler et al. |
| 7,500,373 | B2 | 3/2009 | Quell |
| 7,586,062 | B2 | 9/2009 | Heberer |
| 7,637,134 | B2 | 12/2009 | Burzlaff et al. |
| 7,710,347 | B2 | 5/2010 | Gentilman et al. |
| 7,716,802 | B2 | 5/2010 | Stern et al. |
| 7,745,293 | B2 | 6/2010 | Yamazaki et al. |
| 7,766,123 | B2 | 8/2010 | Sakurai et al. |
| 7,852,388 | B2 | 12/2010 | Shimizu et al. |
| 7,908,922 | B2 | 3/2011 | Zarabadi et al. |
| 7,951,324 | B2 | 5/2011 | Naruse et al. |
| 8,094,036 | B2 | 1/2012 | Heberer |
| 8,163,077 | B2 | 4/2012 | Eron et al. |
| 8,286,236 | B2 | 10/2012 | Jung et al. |
| 8,289,352 | B2 | 10/2012 | Vartanian et al. |
| 8,297,096 | B2 | 10/2012 | Mizumura et al. |
| 8,354,170 | B1 | 1/2013 | Henry et al. |
| 8,383,028 | B2 | 2/2013 | Lyons |
| 8,408,036 | B2 | 4/2013 | Reith et al. |
| 8,429,754 | B2 | 4/2013 | Jung et al. |
| 8,437,513 | B1 | 5/2013 | Derakhshani et al. |
| 8,444,903 | B2 | 5/2013 | Lyons et al. |
| 8,452,073 | B2 | 5/2013 | Taminger et al. |
| 8,599,301 | B2 | 12/2013 | Dowski, Jr. et al. |
| 8,606,540 | B2 | 12/2013 | Haisty et al. |
| 8,610,761 | B2 | 12/2013 | Haisty et al. |
| 8,631,996 | B2 | 1/2014 | Quell et al. |
| 8,675,925 | B2 | 3/2014 | Derakhshani et al. |
| 8,678,060 | B2 | 3/2014 | Dietz et al. |
| 8,686,314 | B2 | 4/2014 | Schneegans et al. |
| 8,686,997 | B2 | 4/2014 | Radet et al. |
| 8,694,284 | B2 | 4/2014 | Berard |
| 8,720,876 | B2 | 5/2014 | Reith et al. |
| 8,752,166 | B2 | 6/2014 | Jung et al. |
| 8,755,923 | B2 | 6/2014 | Farahani et al. |
| 8,787,628 | B1 | 7/2014 | Derakhshani et al. |
| 8,818,771 | B2 | 8/2014 | Gielis et al. |
| 8,873,238 | B2 | 10/2014 | Wilkins |
| 8,978,535 | B2 | 3/2015 | Ortiz et al. |
| 9,006,605 | B2 | 4/2015 | Schneegans et al. |
| 9,071,436 | B2 | 6/2015 | Jung et al. |
| 9,101,979 | B2 | 8/2015 | Hofmann et al. |
| 9,104,921 | B2 | 8/2015 | Derakhshani et al. |
| 9,126,365 | B1 | 9/2015 | Mark et al. |
| 9,128,476 | B2 | 9/2015 | Jung et al. |
| 9,138,924 | B2 | 9/2015 | Yen |
| 9,149,988 | B2 | 10/2015 | Mark et al. |
| 9,156,205 | B2 | 10/2015 | Mark et al. |
| 9,186,848 | B2 | 11/2015 | Mark et al. |
| 9,244,986 | B2 | 1/2016 | Karmarkar |
| 9,248,611 | B2 | 2/2016 | Divine et al. |
| 9,254,535 | B2 | 2/2016 | Buller et al. |
| 9,266,566 | B2 | 2/2016 | Kim |
| 9,269,022 | B2 | 2/2016 | Rhoads et al. |
| 9,327,452 | B2 | 5/2016 | Mark et al. |
| 9,329,020 | B1 | 5/2016 | Napoletano |
| 9,332,251 | B2 | 5/2016 | Haisty et al. |
| 9,346,127 | B2 | 5/2016 | Buller et al. |
| 9,389,315 | B2 | 7/2016 | Bruder et al. |
| 9,399,256 | B2 | 7/2016 | Buller et al. |
| 9,403,235 | B2 | 8/2016 | Buller et al. |
| 9,418,193 | B2 | 8/2016 | Dowski, Jr. et al. |
| 9,457,514 | B2 | 10/2016 | Schwärzler |
| 9,469,057 | B2 | 10/2016 | Johnson et al. |
| 9,478,063 | B2 | 10/2016 | Rhoads et al. |
| 9,481,402 | B1 | 11/2016 | Muto et al. |
| 9,486,878 | B2 | 11/2016 | Buller et al. |
| 9,486,960 | B2 | 11/2016 | Paschkewitz et al. |
| 9,502,993 | B2 | 11/2016 | Deng |
| 9,525,262 | B2 | 12/2016 | Stuart et al. |
| 9,533,526 | B1 | 1/2017 | Nevins |
| 9,555,315 | B2 | 1/2017 | Aders |
| 9,555,580 | B1 | 1/2017 | Dykstra et al. |
| 9,557,856 | B2 | 1/2017 | Send et al. |
| 9,566,742 | B2 | 2/2017 | Keating et al. |
| 9,566,758 | B2 | 2/2017 | Cheung et al. |
| 9,573,193 | B2 | 2/2017 | Buller et al. |
| 9,573,225 | B2 | 2/2017 | Buller et al. |
| 9,586,290 | B2 | 3/2017 | Buller et al. |
| 9,595,795 | B2 | 3/2017 | Lane et al. |
| 9,597,843 | B2 | 3/2017 | Stauffer et al. |
| 9,600,929 | B1 | 3/2017 | Young et al. |
| 9,609,755 | B2 | 3/2017 | Coull et al. |
| 9,610,737 | B2 | 4/2017 | Johnson et al. |
| 9,611,667 | B2 | 4/2017 | GangaRao et al. |
| 9,616,623 | B2 | 4/2017 | Johnson et al. |
| 9,626,487 | B2 | 4/2017 | Jung et al. |
| 9,626,489 | B2 | 4/2017 | Nilsson |
| 9,643,361 | B2 | 5/2017 | Liu |
| 9,662,840 | B1 | 5/2017 | Buller et al. |
| 9,665,182 | B2 | 5/2017 | Send et al. |
| 9,672,389 | B1 | 6/2017 | Mosterman et al. |
| 9,672,550 | B2 | 6/2017 | Apsley et al. |
| 9,676,145 | B2 | 6/2017 | Buller et al. |
| 9,684,919 | B2 | 6/2017 | Apsley et al. |
| 9,688,032 | B2 | 6/2017 | Kia et al. |
| 9,690,286 | B2 | 6/2017 | Hovsepian et al. |
| 9,700,966 | B2 | 7/2017 | Kraft et al. |
| 9,703,896 | B2 | 7/2017 | Zhang et al. |
| 9,713,903 | B2 | 7/2017 | Paschkewitz et al. |
| 9,718,302 | B2 | 8/2017 | Young et al. |
| 9,718,434 | B2 | 8/2017 | Hector, Jr. et al. |
| 9,724,877 | B2 | 8/2017 | Flitsch et al. |
| 9,724,881 | B2 | 8/2017 | Johnson et al. |
| 9,725,178 | B2 | 8/2017 | Wang |
| 9,731,730 | B2 | 8/2017 | Stiles |
| 9,731,773 | B2 | 8/2017 | Gami et al. |
| 9,741,954 | B2 | 8/2017 | Bruder et al. |
| 9,747,352 | B2 | 8/2017 | Karmarkar |
| 9,764,415 | B2 | 9/2017 | Seufzer et al. |
| 9,764,520 | B2 | 9/2017 | Johnson et al. |
| 9,765,226 | B2 | 9/2017 | Dain |
| 9,770,760 | B2 | 9/2017 | Liu |
| 9,773,393 | B2 | 9/2017 | Velez |
| 9,776,234 | B2 | 10/2017 | Schaafhausen et al. |
| 9,782,936 | B2 | 10/2017 | Glunz et al. |
| 9,783,324 | B2 | 10/2017 | Embler et al. |
| 9,783,977 | B2 | 10/2017 | Alqasimi et al. |
| 9,789,548 | B2 | 10/2017 | Golshany et al. |
| 9,789,922 | B2 | 10/2017 | Dosenbach et al. |
| 9,796,137 | B2 | 10/2017 | Zhang et al. |
| 9,802,108 | B2 | 10/2017 | Aders |
| 9,809,977 | B2 | 11/2017 | Carney et al. |
| 9,817,922 | B2 | 11/2017 | Glunz et al. |
| 9,818,071 | B2 | 11/2017 | Jung et al. |
| 9,821,339 | B2 | 11/2017 | Paschkewitz et al. |
| 9,821,411 | B2 | 11/2017 | Buller et al. |
| 9,823,143 | B2 | 11/2017 | Twelves, Jr. et al. |
| 9,829,564 | B2 | 11/2017 | Bruder et al. |
| 9,846,933 | B2 | 12/2017 | Yuksel |
| 9,854,828 | B2 | 1/2018 | Langeland |
| 9,858,604 | B2 | 1/2018 | Apsley et al. |
| 9,862,833 | B2 | 1/2018 | Hasegawa et al. |
| 9,862,834 | B2 | 1/2018 | Hasegawa et al. |
| 9,863,885 | B2 | 1/2018 | Zaretski et al. |
| 9,870,629 | B2 | 1/2018 | Cardno et al. |
| 9,879,981 | B1 | 1/2018 | Dehghan Niri et al. |
| 9,884,663 | B2 | 2/2018 | Czinger et al. |

(56) References Cited

U.S. PATENT DOCUMENTS

| | | | |
|---|---|---|---|
| 9,898,776 | B2 | 2/2018 | Apsley et al. |
| 9,914,150 | B2 | 3/2018 | Pettersson et al. |
| 9,919,360 | B2 | 3/2018 | Buller et al. |
| 9,931,697 | B2 | 4/2018 | Levin et al. |
| 9,933,031 | B2 | 4/2018 | Bracamonte et al. |
| 9,933,092 | B2 | 4/2018 | Sindelar |
| 9,957,031 | B2 | 5/2018 | Golshany et al. |
| 9,958,535 | B2 | 5/2018 | Send et al. |
| 9,962,767 | B2 | 5/2018 | Buller et al. |
| 9,963,978 | B2 | 5/2018 | Johnson et al. |
| 9,971,920 | B2 | 5/2018 | Derakhshani et al. |
| 9,976,063 | B2 | 5/2018 | Childers et al. |
| 9,987,792 | B2 | 6/2018 | Flitsch et al. |
| 9,988,136 | B2 | 6/2018 | Tiryaki et al. |
| 9,989,623 | B2 | 6/2018 | Send et al. |
| 9,990,565 | B2 | 6/2018 | Rhoads et al. |
| 9,994,339 | B2 | 6/2018 | Colson et al. |
| 9,996,890 | B1 | 6/2018 | Cinnamon et al. |
| 9,996,945 | B1 | 6/2018 | Holzer et al. |
| 10,002,215 | B2 | 6/2018 | Dowski et al. |
| 10,006,156 | B2 | 6/2018 | Kirkpatrick |
| 10,011,089 | B2 | 7/2018 | Lyons et al. |
| 10,011,685 | B2 | 7/2018 | Childers et al. |
| 10,012,532 | B2 | 7/2018 | Send et al. |
| 10,013,777 | B2 | 7/2018 | Mariampillai et al. |
| 10,015,908 | B2 | 7/2018 | Williams et al. |
| 10,016,852 | B2 | 7/2018 | Broda |
| 10,016,942 | B2 | 7/2018 | Mark et al. |
| 10,017,384 | B1 | 7/2018 | Greer et al. |
| 10,018,576 | B2 | 7/2018 | Herbsommer et al. |
| 10,022,792 | B2 | 7/2018 | Srivas et al. |
| 10,022,912 | B2 | 7/2018 | Kia et al. |
| 10,027,376 | B2 | 7/2018 | Sankaran et al. |
| 10,029,415 | B2 | 7/2018 | Swanson et al. |
| 10,040,239 | B2 | 8/2018 | Brown, Jr. |
| 10,046,412 | B2 | 8/2018 | Blackmore |
| 10,048,769 | B2 | 8/2018 | Selker et al. |
| 10,052,712 | B2 | 8/2018 | Blackmore |
| 10,052,820 | B2 | 8/2018 | Kemmer et al. |
| 10,055,536 | B2 | 8/2018 | Maes et al. |
| 10,058,764 | B2 | 8/2018 | Aders |
| 10,058,920 | B2 | 8/2018 | Buller et al. |
| 10,061,906 | B2 | 8/2018 | Nilsson |
| 10,065,270 | B2 | 9/2018 | Buller et al. |
| 10,065,361 | B2 | 9/2018 | Susnjara et al. |
| 10,065,367 | B2 | 9/2018 | Brown, Jr. |
| 10,068,316 | B1 | 9/2018 | Holzer et al. |
| 10,071,422 | B2 | 9/2018 | Buller et al. |
| 10,071,525 | B2 | 9/2018 | Susnjara et al. |
| 10,072,179 | B2 | 9/2018 | Drijfhout |
| 10,074,128 | B2 | 9/2018 | Colson et al. |
| 10,076,875 | B2 | 9/2018 | Mark et al. |
| 10,076,876 | B2 | 9/2018 | Mark et al. |
| 10,081,140 | B2 | 9/2018 | Paesano et al. |
| 10,081,431 | B2 | 9/2018 | Seack et al. |
| 10,086,568 | B2 | 10/2018 | Snyder et al. |
| 10,087,320 | B2 | 10/2018 | Simmons et al. |
| 10,087,556 | B2 | 10/2018 | Gallucci et al. |
| 10,099,427 | B2 | 10/2018 | Mark et al. |
| 10,100,542 | B2 | 10/2018 | GangaRao et al. |
| 10,100,890 | B2 | 10/2018 | Bracamonte et al. |
| 10,107,344 | B2 | 10/2018 | Bracamonte et al. |
| 10,108,766 | B2 | 10/2018 | Druckman et al. |
| 10,113,600 | B2 | 10/2018 | Bracamonte et al. |
| 10,118,347 | B2 | 11/2018 | Stauffer et al. |
| 10,118,579 | B2 | 11/2018 | Lakic |
| 10,120,078 | B2 | 11/2018 | Bruder et al. |
| 10,124,546 | B2 | 11/2018 | Johnson et al. |
| 10,124,570 | B2 | 11/2018 | Evans et al. |
| 10,137,500 | B2 | 11/2018 | Blackmore |
| 10,138,354 | B2 | 11/2018 | Groos et al. |
| 10,144,126 | B2 | 12/2018 | Krohne et al. |
| 10,145,110 | B2 | 12/2018 | Carney et al. |
| 10,151,363 | B2 | 12/2018 | Bracamonte et al. |
| 10,152,661 | B2 | 12/2018 | Kieser |
| 10,160,278 | B2 | 12/2018 | Coombs et al. |
| 10,161,021 | B2 | 12/2018 | Lin et al. |
| 10,166,752 | B2 | 1/2019 | Evans et al. |
| 10,166,753 | B2 | 1/2019 | Evans et al. |
| 10,171,578 | B1 | 1/2019 | Cook et al. |
| 10,173,255 | B2 | 1/2019 | TenHouten et al. |
| 10,173,327 | B2 | 1/2019 | Kraft et al. |
| 10,178,800 | B2 | 1/2019 | Mahalingam et al. |
| 10,179,640 | B2 | 1/2019 | Wilkerson |
| 10,183,330 | B2 | 1/2019 | Buller et al. |
| 10,183,478 | B2 | 1/2019 | Evans et al. |
| 10,189,187 | B2 | 1/2019 | Keating et al. |
| 10,189,240 | B2 | 1/2019 | Evans et al. |
| 10,189,241 | B2 | 1/2019 | Evans et al. |
| 10,189,242 | B2 | 1/2019 | Evans et al. |
| 10,190,424 | B2 | 1/2019 | Johnson et al. |
| 10,195,693 | B2 | 2/2019 | Buller et al. |
| 10,196,539 | B2 | 2/2019 | Boonen et al. |
| 10,197,338 | B2 | 2/2019 | Melsheimer |
| 10,200,677 | B2 | 2/2019 | Trevor et al. |
| 10,201,932 | B2 | 2/2019 | Flitsch et al. |
| 10,201,941 | B2 | 2/2019 | Evans et al. |
| 10,202,673 | B2 | 2/2019 | Lin et al. |
| 10,204,216 | B2 | 2/2019 | Nejati et al. |
| 10,207,454 | B2 | 2/2019 | Buller et al. |
| 10,209,065 | B2 | 2/2019 | Estevo, Jr. et al. |
| 10,210,662 | B2 | 2/2019 | Holzer et al. |
| 10,213,837 | B2 | 2/2019 | Kondoh |
| 10,214,248 | B2 | 2/2019 | Hall et al. |
| 10,214,252 | B2 | 2/2019 | Schellekens et al. |
| 10,214,275 | B2 | 2/2019 | Goehlich |
| 10,220,575 | B2 | 3/2019 | Reznar |
| 10,220,881 | B2 | 3/2019 | Tyan et al. |
| 10,221,530 | B2 | 3/2019 | Driskell et al. |
| 10,226,900 | B1 | 3/2019 | Nevins |
| 10,232,550 | B2 | 3/2019 | Evans et al. |
| 10,234,342 | B2 | 3/2019 | Moorlag et al. |
| 10,237,477 | B2 | 3/2019 | Trevor et al. |
| 10,252,335 | B2 | 4/2019 | Buller et al. |
| 10,252,336 | B2 | 4/2019 | Buller et al. |
| 10,254,499 | B1 | 4/2019 | Cohen et al. |
| 10,257,499 | B2 | 4/2019 | Hintz et al. |
| 10,259,044 | B2 | 4/2019 | Buller et al. |
| 10,268,181 | B1 | 4/2019 | Nevins |
| 10,269,225 | B2 | 4/2019 | Velez |
| 10,272,860 | B2 | 4/2019 | Mohapatra et al. |
| 10,272,862 | B2 | 4/2019 | Whitehead |
| 10,275,564 | B2 | 4/2019 | Ridgeway et al. |
| 10,279,580 | B2 | 5/2019 | Evans et al. |
| 10,285,219 | B2 | 5/2019 | Fetfatsidis et al. |
| 10,286,452 | B2 | 5/2019 | Buller et al. |
| 10,286,603 | B2 | 5/2019 | Buller et al. |
| 10,286,961 | B2 | 5/2019 | Hillebrecht et al. |
| 10,289,263 | B2 | 5/2019 | Troy et al. |
| 10,289,875 | B2 | 5/2019 | Singh et al. |
| 10,291,193 | B2 | 5/2019 | Dandu et al. |
| 10,294,552 | B2 | 5/2019 | Liu et al. |
| 10,294,982 | B2 | 5/2019 | Gabrys et al. |
| 10,295,989 | B1 | 5/2019 | Nevins |
| 10,303,159 | B2 | 5/2019 | Czinger et al. |
| 10,307,824 | B2 | 6/2019 | Kondoh |
| 10,310,197 | B1 | 6/2019 | Droz et al. |
| 10,313,651 | B2 | 6/2019 | Trevor et al. |
| 10,315,252 | B2 | 6/2019 | Mendelsberg et al. |
| 10,336,050 | B2 | 7/2019 | Susnjara |
| 10,337,542 | B2 | 7/2019 | Hesslewood et al. |
| 10,337,952 | B2 | 7/2019 | Bosetti et al. |
| 10,339,266 | B2 | 7/2019 | Urick et al. |
| 10,343,330 | B2 | 7/2019 | Evans et al. |
| 10,343,331 | B2 | 7/2019 | McCall et al. |
| 10,343,355 | B2 | 7/2019 | Evans et al. |
| 10,343,724 | B2 | 7/2019 | Polewarczyk et al. |
| 10,343,725 | B2 | 7/2019 | Martin et al. |
| 10,350,823 | B2 | 7/2019 | Rolland et al. |
| 10,356,341 | B2 | 7/2019 | Holzer et al. |
| 10,356,395 | B2 | 7/2019 | Holzer et al. |
| 10,357,829 | B2 | 7/2019 | Spink et al. |
| 10,357,957 | B2 | 7/2019 | Buller et al. |
| 10,359,756 | B2 | 7/2019 | Newell et al. |

(56)  References Cited

U.S. PATENT DOCUMENTS

| | | |
|---|---|---|
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 10,821,678 B2 | 11/2020 | Schmidt et al. |
| 2006/0108783 A1 | 5/2006 | Ni et al. |
| 2014/0277669 A1 | 9/2014 | Nardi et al. |
| 2017/0113344 A1 | 4/2017 | Schönberg |
| 2017/0341309 A1 | 11/2017 | Piepenbrock et al. |
| 2018/0059644 A1* | 3/2018 | Lection .............. G05B 19/4099 |
| 2019/0146456 A1 | 5/2019 | Czinger et al. |
| 2019/0224911 A1* | 7/2019 | Shuck .................... B33Y 80/00 |
| 2020/0147684 A1 | 5/2020 | Bowden, Jr. et al. |
| 2020/0147897 A1* | 5/2020 | Schmidt ................ G06Q 50/04 |
| 2020/0166907 A1* | 5/2020 | Frederick ............... B33Y 10/00 |
| 2020/0238446 A1 | 7/2020 | Worthing, Jr. et al. |
| 2021/0187792 A1* | 6/2021 | Poirier ................... B29C 70/46 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion in PCT/US2022/037641, mailed Oct. 17, 2022, 18 pages.
European search report received for patent application No. 22856402.7, mailed on May 19, 2025, 14 Pages.

* cited by examiner

Direction of Part Motion

DED System 100

FIRST COMPONENT 200

TOP 216

TONGUE 202

SIDE SURFACE 212

TOP SURFACE 204

FRONT SURFACE 206

BOTTOM SURFACE 208

SIDE SURFACE 210

BOTTOM 214

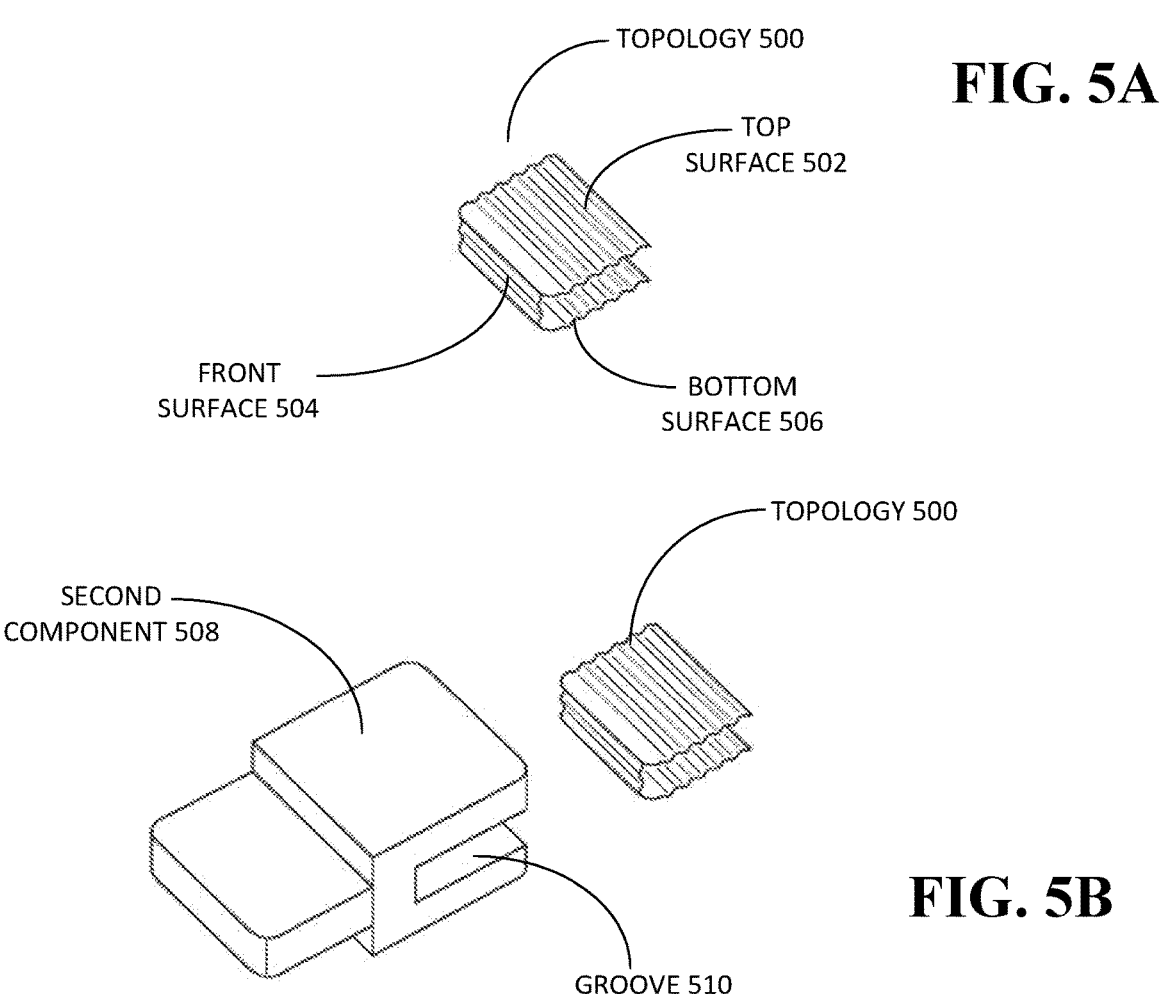
TOPOLOGY 500
TOP SURFACE 502
FRONT SURFACE 504
BOTTOM SURFACE 506
FIG. 5A
TOPOLOGY 500
SECOND COMPONENT 508
GROOVE 510
FIG. 5B
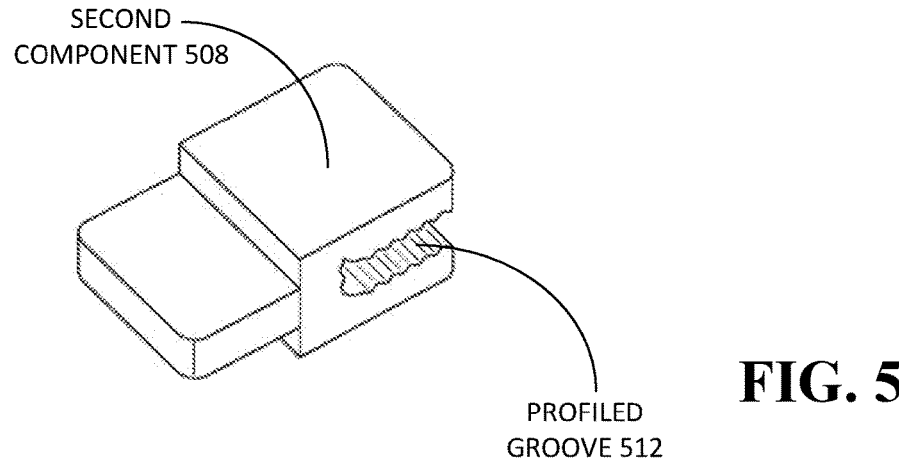
SECOND COMPONENT 508
PROFILED GROOVE 512
FIG. 5C

FIRST COMPONENT
200

SECOND
COMPONENT 508

PROFILED
GROOVE 512

TONGUE 202

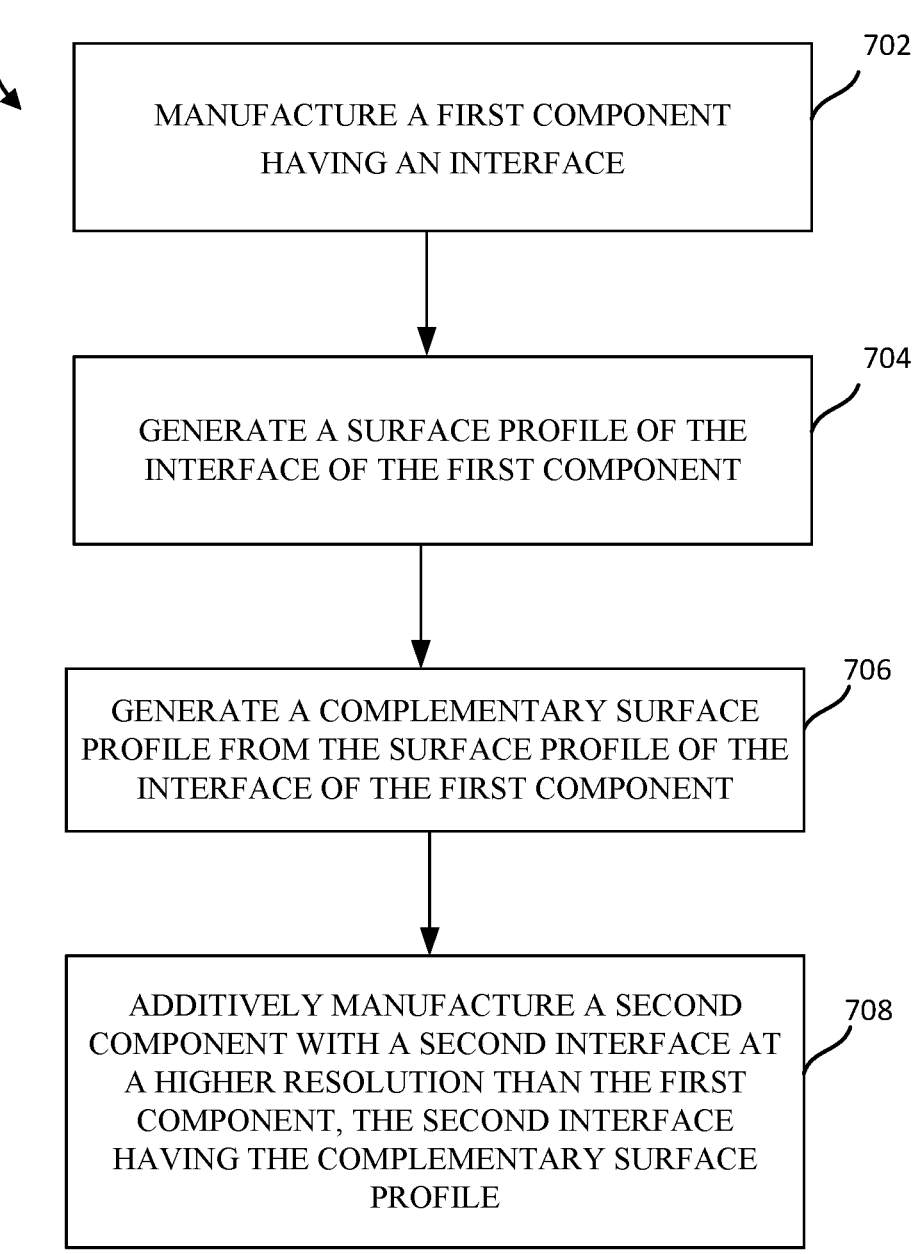

700

702
MANUFACTURE A FIRST COMPONENT
HAVING AN INTERFACE

704
GENERATE A SURFACE PROFILE OF THE
INTERFACE OF THE FIRST COMPONENT

706
GENERATE A COMPLEMENTARY SURFACE
PROFILE FROM THE SURFACE PROFILE OF THE
INTERFACE OF THE FIRST COMPONENT

708
ADDITIVELY MANUFACTURE A SECOND
COMPONENT WITH A SECOND INTERFACE AT
A HIGHER RESOLUTION THAN THE FIRST
COMPONENT, THE SECOND INTERFACE
HAVING THE COMPLEMENTARY SURFACE
PROFILE

FIG. 7

INTEGRATING ADDITIVELY-MANUFACTURED COMPONENTS

BACKGROUND

Field

The present disclosure relates generally to the use of a high-throughput, lower precision additive manufacturing process to produce large components in conjunction with a higher precision, lower throughput additive manufacturing process, and the formation of a structural joint between the two components.

Description of the Related Art

Three-dimensional (3-D) printing, also referred to as additive manufacturing (AM), has recently presented new opportunities to more efficiently build complex transport structures, such as automobiles, aircraft, boats, motorcycles, busses, trains, and the like. AM techniques are capable of fabricating complex components from a wide variety of materials. Applying AM processes to industries that produce these products has proven to produce a structurally more efficient transport structure. For example, an automobile produced using 3-D printed components can be made stronger, lighter, and consequently, more fuel efficient. Moreover, AM enables manufacturers to 3-D print components that are much more complex and that are equipped with more advanced features and capabilities than components made via traditional machining and casting techniques.

Despite these recent advances, a number of obstacles remain with respect to the practical implementation of AM techniques in transport structures and other assemblies.

SUMMARY

The present disclosure is generally directed to techniques for joining additively manufactured components.

One tradeoff faced by designers in AM is that in general, the more sophisticated the features or functions designed for use in a component to be 3-D printed, the lower the expected production volume. The production volume also decreases with the increasing size of the 3-D printed component. These practical limitations are often inherent in certain AM processes, which may rely on slower printing speeds for accurate rendering of complex geometries and which must apply more overall layers to render large structures. Still other technology-dependent factors are relevant to determining the overall production value, including throughput, of a particular AM technology.

AM can be contrasted with conventional manufacturing techniques such as machining, milling, molding, forging, casting and the like. Casting, for one, can efficiently produce structures with a high throughput even where the structures are voluminous or heavy. However, casting and other conventional techniques are typically not economically suitable for high-throughput production of more complex structures. These include structures with sophisticated internal features, precise material properties, rigid tolerance requirements, and/or other complex internal architectural attributes. Using conventional manufacturing techniques to produce these types of precision components can be extremely expensive. For instance, machining techniques can produce very precise and complex geometrical structures having intricate features. However, machining is inherently not cost-effective, and more often than not, is prohibitively expensive for applications that rely on any kind of high-volume production of such complex structures. Furthermore, due to inherent physical limitations of the process, some structures cannot be manufactured using machining. An example includes lattice structures, which are utilized in some modern mechanized technologies due to their versatility and lightweight nature. Thus, other alternatives must be considered.

Furthermore, joining components that may exhibit minor variations in size is one such area that has proven difficult to overcome. For instance, conventional manufacturing processes provide simple internal designs configured to closely fit around and seal a component in place. However, such structures are limiting in that manufactured components that may be slightly thicker, for example, may be too large and consequently wasted. Each wasted component adds to the manufacturing cost of the product and due to the inflexibility of the conventionally manufactured designs, a significant amount of waste can occur. This phenomenon drives up the manufacturing cost, which is often passed onto the consumer. The attendant raising of consumer costs can, in turn, be problematic because the high price tag often associated with complex products alienates a significant number of consumers.

Techniques are consequently needed for integrating the benefits of AM and its ability to create complex structures with sophisticated features, on the one hand, with the advantages of higher-throughput manufacturing techniques to effect decreased lead times and increased production capacities, on the other hand, to thereby enable the manufacture of structures that enjoy the combined benefits of both.

An apparatus in accordance with an aspect of the present disclosure comprises a first component comprising a first feature having a first surface profile, and an additively-manufactured second component comprising a second feature having a second surface profile, wherein the second surface profile is generated at least in part from the first surface profile of the first interface, such that the first surface profile is configured to mate with the second surface profile.

Such an apparatus further optionally includes the first feature comprising a tongue structure and the second feature comprising a groove structure, such that the tongue structure is configured to mate with the groove structure, the first component being additively-manufactured using direct energy deposition, the second component being additively-manufactured using powder bed fusion, the second surface profile being generated by a three-dimensional scan, a model being generated from the first surface profile, the second surface profile being generated by a computer-aided design model, the second surface profile being additively-manufactured to include an offset from the first surface profile, the offset being configured to allow an adhesive to be applied within the offset, and may further comprise an adhesive, coupled between the first surface profile and the second surface profile.

A method in accordance with an aspect of the present disclosure comprises manufacturing a first component having an interface, generating a surface profile of the interface of the first component, generating a complementary surface profile from the surface profile of the interface of the first component, and additively manufacturing a second component with a second interface at a higher resolution than the first component, the second interface having the complementary surface profile.

Such a method further optionally includes manufacturing the interface of the first component as a tongue structure, additively manufacturing the interface of the second component as a groove structure; and configuring the groove structure to mate with the tongue structure, additively manufacturing the first component using direct energy deposition, additively manufacturing the second component using powder bed fusion, generating the surface profile of the interface of the first component using a three-dimensional scan, generating a model from the surface profile of the interface of the first component, generating the complementary surface profile by a computer-aided design model, generating the complementary surface profile with an offset from the surface profile, configuring the offset to accept an adhesive, and applying an adhesive to at least one of the surface profile and the complementary surface profile.

It will be understood that other aspects of joining components will become readily apparent to those skilled in the art from the following detailed description, wherein it is shown and described only several embodiments by way of illustration. As will be appreciated by those skilled in the art, the joining of additively manufactured components can be realized with other embodiments without departing from the invention. Accordingly, the drawings and detailed description are to be regarded as illustrative in nature and not as restrictive.

BRIEF DESCRIPTION OF THE DRAWINGS

Various aspects of using a high-throughput, lower precision additive manufacturing process to produce large components in conjunction with a higher precision, lower throughput additive manufacturing process and the formation of a structural joint between the two components will now be presented in the detailed description by way of example, and not by way of limitation, in the accompanying drawings, wherein:

FIGS. 5A-5C illustrate perspective views of a complementary surface profile generated from the surface profile of the interface of the first component in accordance with an aspect of the present disclosure.

FIG. 7 illustrates a process for joining an additively-manufactured first component in accordance with an aspect of the present disclosure.

DETAILED DESCRIPTION

Figure 1:
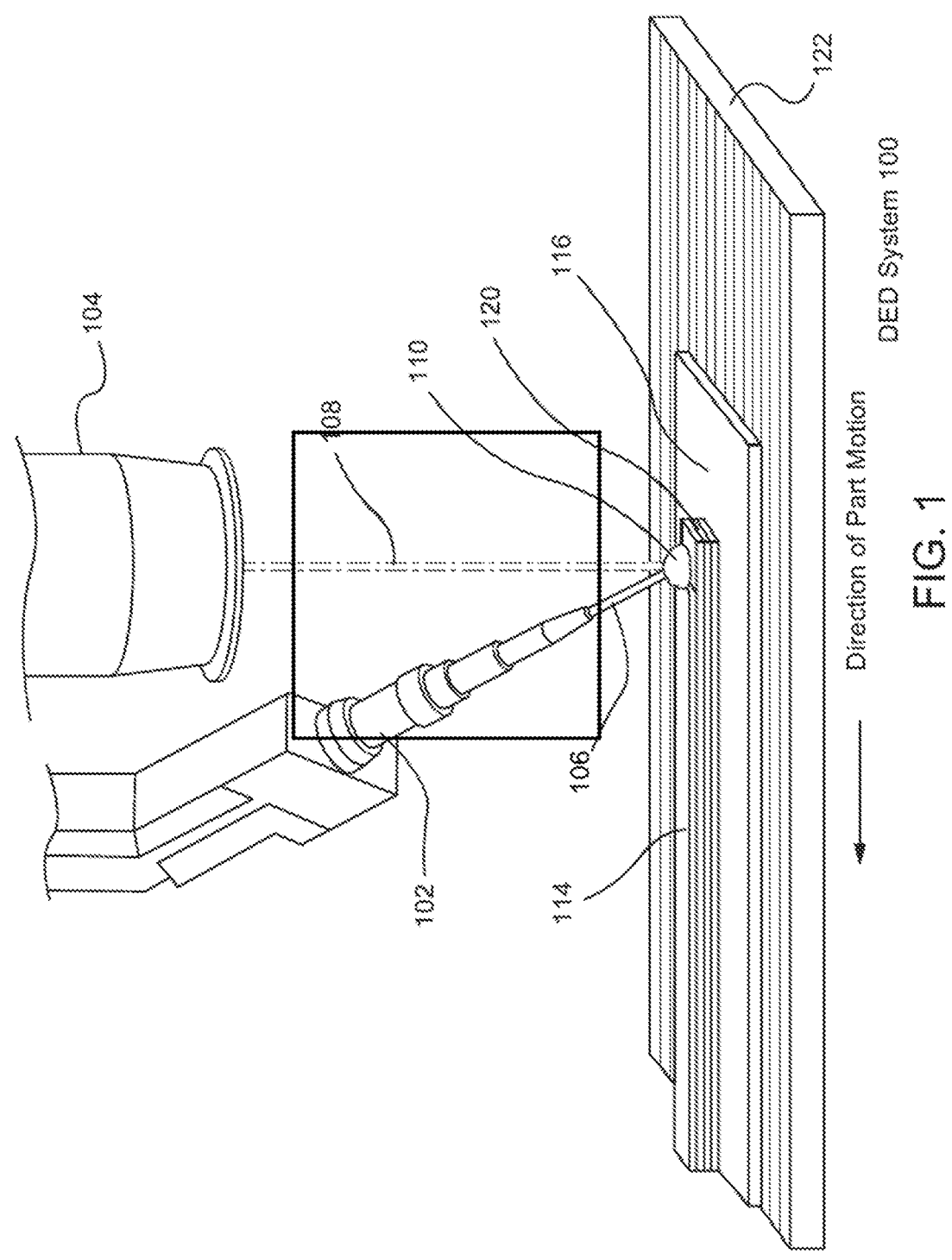
FIG. 1 illustrates an exemplary Directed Energy Deposition (DED) system in accordance with an aspect of the present disclosure.

The detailed description set forth below in connection with the drawings is intended to provide a description of exemplary embodiments of joining additively manufactured nodes and subcomponents, and it is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

Additive Manufacturing

Additive Manufacturing (AM) involves the use of a stored geometrical model for accumulating layered materials on a build plate to produce a three-dimensional (3-D) build piece having features defined by the model. AM techniques are capable of printing complex components using a wide variety of materials. A 3-D object may be fabricated based on a computer aided design (CAD) model. The CAD model can be used to generate a set of instructions or commands that are compatible with a particular 3-D printer. The AM process can create a solid three-dimensional object using the CAD model and print instructions. In the AM process, different materials or combinations of material, such as engineered plastics, thermoplastic elastomers, metals, ceramics, and/or alloys or combinations of the above, etc., may be used to create a uniquely shaped 3-dimensional object.

The use of AM in the context of joining two or more components may provide significant flexibility and cost saving benefits. These, and other benefits may enable manufacturers of mechanical structures to produce components at a lower cost and/or in a more efficient manner. The joining techniques described in the present disclosure relate to a process for connecting AM components and/or commercial off the shelf (COTS) components. AM components are 3-D components that are printed by, for example, adding layer upon layer of one or more materials based on a preprogramed design. The components described herein may be components used to assemble a variety of devices, such as engine components, structural components, etc. Further, such AM or COTS components may be used in assemblies, such as vehicles, trucks, trains, motorcycles, boats, aircraft, and the like, or other mechanized assemblies, without departing from the scope of the present disclosure.

AM techniques can be used to produce high-throughput, lower precision components as well as lower-throughput, higher precision components depending on the application and/or desired precision for each component. Further, in an aspect of the present disclosure, different techniques may be used for components that are to be joined together in an assembly.

In an aspect of the present disclosure, a scan of one component, e.g., a lower precision component, can be performed, and the boundaries for the tolerances for the lower precision component may be used as inputs to produce a higher precision mating component, such that the interface between the lower precision component and the higher precision component has a tighter tolerance than if both components were lower precision components. Further, in an aspect of the present disclosure, the combination of lower precision components and higher precision components at interfaces, where more exacting tolerances are necessary, may increase the efficiency of the overall AM process, as fewer components may require high tolerances.

In an aspect of the present disclosure, the optical scan of the lower precision component may be used as an input to a higher precision AM process to produce large components with customized portions for connection with a specific component. Customized structural connections between specific, paired components may also increase the efficiency and/or reduce the cost to produce AM manufactured assemblies.

Components and Terminology in AM

In an aspect of the present disclosure, a component is an example of an AM component. A component may be any 3-D printed component that includes features, such as an interface, for mating with another component. The component may have internal or external features configured to accept a particular type of component. Alternatively or additionally, the component may be shaped to accept a particular type of component. A component may utilize any internal design or shape and accept any variety of components without departing from the scope of the disclosure.

A component interface may be configured to connect to an interface of another component. For example, and not by way of limitation, an interface between components may be a tongue-and-groove structure. The interface may have high precision features or complex geometries that allow them to perform specific functions, including creating connections to spanning structures such as tubes, structural panels, extrusions, sheet metal, and/or other structural members. In various embodiments, interfaces are structures that incorporate one or more high precision features and that connect to other components or to Linking Nodes to form a versatile and efficient arrangement of functional components.

Interfaces may be high precision structures, meaning that they incorporate one or more features and/or functions that have tighter tolerances than other portions of the component. For example, and not by way of limitation, the tongue of one component may have a tolerance specified that enables the tongue to fit within a groove of another component, with a uniform flatness on all of the tongue surfaces to allow for a consistent volume of adhesive to flow between the tongue and mating groove. These features and/or functions, which may be integrated into the interface, may be defined by numerous physical properties and characteristics. Because the interface may be a complex consolidation of structures integrated into a single component, the interface may include both intricate connection features and sophisticated functional capabilities. These features and capabilities may enable the interface to seamlessly connect with larger, lower precision components without requiring a significant sacrifice in production throughput.

For clarity, components may also include relatively simple connection features configured to connect with the more sophisticated network of connection features of the interface to form streamlined connections between structures. While these components may incorporate more basic features, they advantageously may be 3-D printed at a higher print rate. Alternatively, components may be built using a suitable non 3-D print manufacturing technology.

A number of different AM technologies may be well-suited for construction of components in a transport structure or other mechanized assembly. Such 3-D printing techniques may include, for example, directed energy deposition (DED), selective laser melting (SLM), selective laser sintering (SLS), direct metal laser sintering (DMLS), electron beam melting (EBM), powder bed fusion (PBF), and/or other AM processes involving melting or fusion of metallic powders. An advantage of the approach described herein is the structural improvements in joining components at interfaces.

As in many 3-D printing techniques, these processes (e.g., PBF systems) can create build pieces layer-by-layer. Each layer or "slice" is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up. SLS and various other PBF techniques may be well suited to construction of gear cases and other transport structure components. However, it will be appreciated that other AM techniques, such as fused deposition modeling (FDM) and the like, are also possible for use in such applications.

The thickness of a layer, or precision of the overall component, may be referred to as the "resolution" of a component and/or 3-D printing technique. At higher resolutions, which may have a lower throughputs, a 3-D printer can 3-D print thinner layers, finer details, and with greater precision. However, 3-D printing at higher resolutions also requires 3-D printing more layers, which, in turn, may take more time. Conversely, at lower resolutions (or higher throughputs), a 3-D printer can 3-D print thicker layers, fewer details, and at a lower precision. Thus, a higher production volume using lower resolution 3-D printing techniques may be achieved.

3-D printing structures, such as components, interfaces, or other structures, using lower resolution 3-D printing techniques may be desirable for large and cumbersome structures that include basic features and geometries. Lower resolution 3-D printing techniques may be used to 3-D print these large and cumbersome structures as higher resolution 3-D printing techniques may be deficient in that print times for large structures are generally long, which may result in compromised production volume, and increased material consumption for printing these structures.

In an aspect of the present disclosure, manufacturers may combine the use of lower resolution and higher resolution 3-D printing techniques to potentially reduce post-printing machining techniques. For example, and not by way of limitation, the component may include various geometrical features distributed within or across its boundaries for performing specified functions. In the design phase of this exemplary embodiment, the high precision functions and connection features of the structure may be consolidated into one or more interfaces. The interface may thereupon be 3-D printed using a high-precision, slower printing processes to achieve the required geometrical and material complexity of the interface. Powder bed fusion, described below, may be one group of AM technologies considered for this high-precision printing. Consequently, unlike the scenario above, the high precision AM is limited to interface structures that retain their original functionality, which may minimize any deleterious effects on production volume.

Directed energy deposition (DED) is an example of a high-throughput, lower precision AM process. DED is an AM technology primarily used to create structures from metals and alloys. This technique is used for both creating 3-D structures and for repairing existing structures. DED can be used for directly depositing material onto existing AM components. DED deposits material via a powder depositor or a wire feedstock.

One advantage of DED is that the technology can also be used to create build pieces including chunks of a single metal or alloy material directly on surfaces of other components. These uniform build pieces may have various uses in a vehicle, for example, where solid metal components are required such as impact structures in a vehicle. The structural composition of current DED systems can vary. For example, in some DED systems, the material depositor is structurally separate from the energy source. In other DED systems, the material depositor and energy source are part of the same apparatus. However, an artifact of DED components are striations resulting from the deposition of material during the additive manufacturing process. Accordingly, removal of material upon completion of the 3-D print is required for these components. The post-processing removal of striations can be a laborious and time-consuming process that introduces substantial inefficiencies into the overall manufacturing process. Manufacturers typically rely on labor-intensive and expensive techniques such as machining to complete the manufacturing process to achieve the desired final product for the 3-D printed component. Machining may result in a smoother surface finish of the component having the striations.

The use of high-throughput, lower precision additive manufacturing processes, such as DED, may use machining to produce high precision components or structures—particularly those having higher-tolerance features such as interfaces. Machining and/or other higher-precision techniques may involve higher costs and/or additional time to produce a given component. Further, machining and/or other techniques have intrinsic deficiencies. For example, machining cannot produce complex internal channels and lattice structures efficiently. Machining also involves the removal of material (also referred to as subtractive manufacturing) that can be inefficient. Machining 3-D components, such as interfaces (e.g., regions such as tongues/grooves to form structural joints), can be an inefficient and time-consuming process for volume manufacturing, which may reduce the desirability of using components as-printed.

A tongue-and-groove (TNG) structure may be used to connect two or more components at an interface. For example, a tongue portion of one component may extend all the way around a peripheral region as a single protrusion disposed around the peripheral region. The tongue portion of a component may protrude outward along the peripheral region relative to that component, and the lateral extension of the tongue portion can be considered in this view as "coming out" of that component.

A groove portion of an interface is a portion of a second component and may be disposed along a peripheral region of the second component. The groove portion may, but need not, comprise the material of the second component. The groove portion may extend all the way around the peripheral region and may be a single channel in the second component. The groove portion may also be inset inward along the peripheral region relative to the second component and runs laterally around the second component and can also be referred to as "coming out" of the figure. The tongue and groove may be arranged on the first and second components such that when the two components are placed into contact, the tongue may align with the groove and may fit into the groove around the peripheral regions at the interface between the two components. In an aspect of the present disclosure, a tongue and/or a groove may include centering features which enable the tongue to be centered in the groove.

While the above description relates primarily to using a tongue-and-groove structure to join two or more components, the techniques described in this disclosure are not only applicable to tongue-and-groove structures. In fact, any suitable technique for joining multiple structures may be used without departing from the scope of the disclosure.

System Description

FIG. 1 illustrates a DED system in accordance with an aspect of the present disclosure.

DED system 100 may include a wire feeder 102 and an electron beam gun 104. Wire feeder 102 ejects wire material 106. Wire feeder 102 may be mounted on a multi-axis arm and can generally move along multiple axes. Although wire material 106 acts as a feedstock for DED system 100, a powder depositor may also be used without departing from the scope of the present disclosure.

Electron beam gun 104, which may be a high power laser beam source, emits an electron beam 108 that melts the wire material 106 into a molten puddle 110 on build piece 114. Build piece 114 may be disposed on a substrate 116. Although substrate 116 is shown as a flat surface in FIG. 1, substrate 116 may have any shape, and, in aspects of the present disclosure, may comprise a surface region of a node or other component.

As build piece 114 is moved and/or electron beam gun 104 is aimed at different spots on build piece 114, layers 120 are formed on build piece 114. Build piece 114 may be moved by moving build plate 122, or electron beam gun 104 may be moved by moving the entire electron beam gun or through the use of reflective mirrors/electric fields to move the placement of beam 108 onto build piece 114. The wire feeder 102 may project the wire material 106 onto the target surface from essentially any angle as a result of the multi-axis arm. The electron beam 108 may be directed towards the wire material 106 immediately after its deposition on the target surface to melt the deposited material and create the molten puddle 110. The molten puddle 110 may then solidify.

The desired shape of the build piece may be formed by controlling the feed rate of the wire material 106 from wire feeder 102 and the angle from which the metal 106 is deposited on the surface. As shown in FIG. 1, build piece 114 is moved by movable plate 122 from the right to the left as the material 106 is ejected from the wire feeder 102. As noted above, the deposition, melting, and solidification of the material 106 may be performed on a layer 120 by layer 120 basis to produce the build piece 114.

Interface Coupling and Integration

Figure 2:
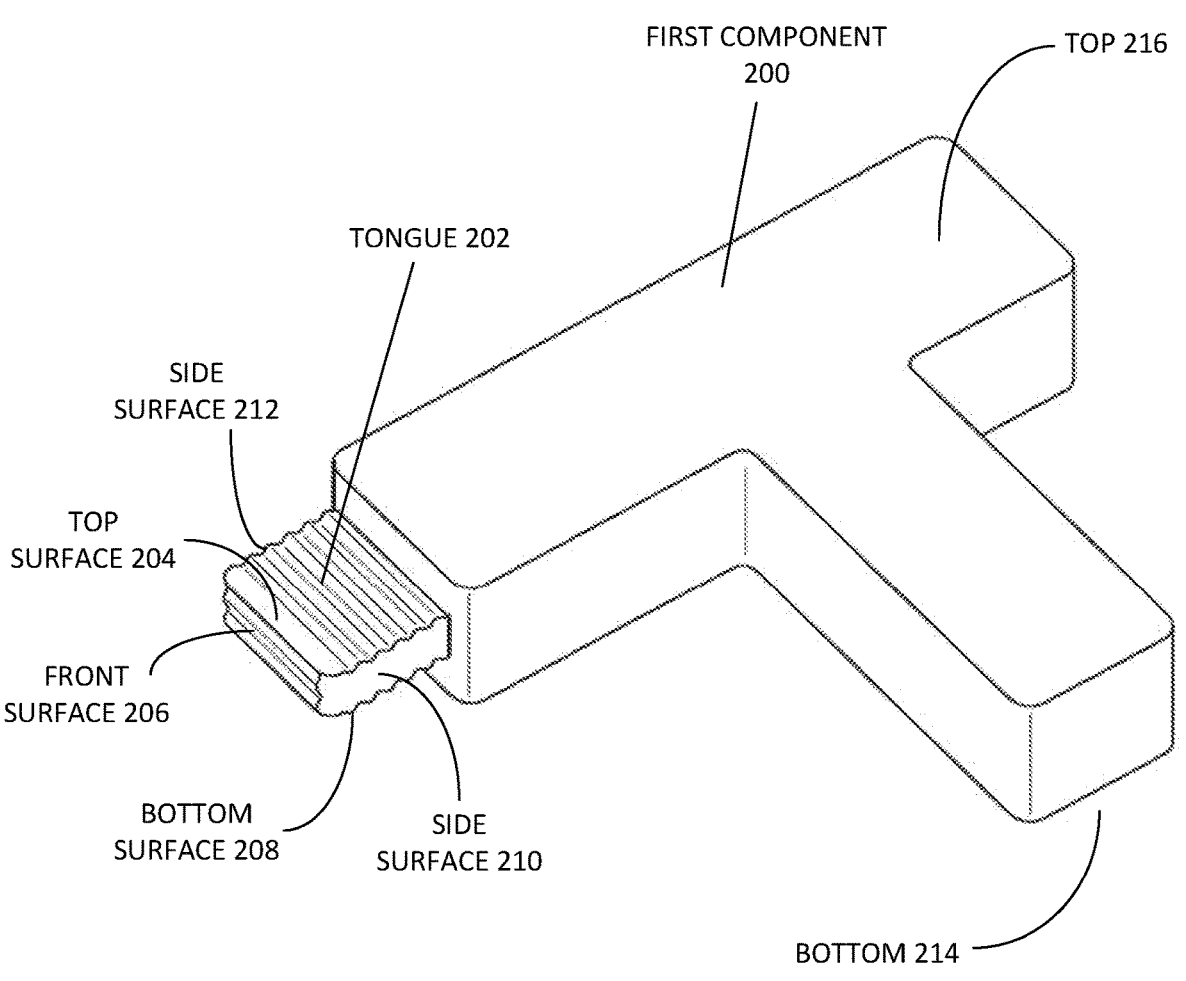
FIG. 2 illustrates a perspective view of an additively-manufactured first component in accordance with an aspect of the present disclosure.

FIG. 2 illustrates a perspective view illustrating an additively-manufactured first component in accordance with an aspect of the present disclosure.

FIG. 2 illustrates first component 200 having tongue 202. In an aspect of the present disclosure, tongue 202 may be configured as an interface to another component in an assembly. In such an aspect, tongue 202 has several surfaces that may be in proximate contact with surfaces of another component: top surface 204, front surface 206, bottom surface 208, side surface 210, and side surface 212. Depending on the shape and/or design of tongue 202, there may be a larger and/or smaller number of surfaces that mate to one or more other components in the assembly.

As shown in FIG. 2, tongue 202 has some surfaces that are relatively flat, i.e., side surface 210 and side surface 212, and other surfaces that are relatively rough, i.e., top surface 204, front surface 206, and bottom surface 208. Depending on which surfaces of tongue 202 that are to be used in interfacing with other components in the assembly, and the tolerances of the interfaces, the relative flatness or roughness of tongue 202 surfaces 204-212 may be outside of the tolerances desired.

The relative flatness and/or smoothness of surfaces 204-212 may be attributable to several factors, e.g., the printing method used for first component 200, the orientation in which first component 200 was printed, the speed at which first component 200 was printed, etc. For example, and not by way of limitation, as shown in FIG. 2 side surfaces 210 and 212 are smoother than top surface 204, front surface 206, and bottom surface 208. This may be because first component 200 was printed from bottom 214 to top 216 and the side surfaces 210 may have been perpendicular to the layers formed during printing of first component 200. Other reasons for differences in relative flatness and/or roughness between surfaces 204-212 may account for such differences. First component may be printed using a relatively low precision printing process or system, such as DED system described with respect to FIG. 1.

Where a relatively rough surface, e.g., top surface 204, front surface 206, and/or bottom surface 208, is configured to interface with another component, some sort of surface treatment can be undertaken to ensure that the interface between first component 200 and another component is as desired. For example, an annealing process may be applied to tongue 202 to smoothen out those surfaces that are too rough for use in an interface, a machining process may be used to flatten a given surface, etc., such that surface-to-surface contact between the components is as desired. Having a known surface area of tongue 202, as well as any components that may interface and/or connect to tongue 202, may improve the strength of the interface between the components.

Additive Manufacturing Environment

FIGS. 3A-3D illustrate respective side views of a 3-D printer system in an aspect of the present disclosure.

In an aspect of the present disclosure, a 3-D printer system may be a powder-bed fusion (PBF) system 300. FIGS. 1A-D show PBF system 300 during different stages of operation. The particular embodiment illustrated in FIGS. 3A-3D is one of many suitable examples of a PBF system employing principles of this disclosure. It should also be noted that elements of FIGS. 3A-3D and the other figures in this disclosure are not necessarily drawn to scale, but may be drawn larger or smaller for the purpose of better illustration of concepts described herein. PBF system 300 can include a depositor 301 that can deposit each layer of metal powder, an energy beam source 303 that can generate an energy beam, a deflector 305 that can apply the energy beam to fuse the powder material, and a build plate 307 that can support one or more build pieces, such as a build piece 309. Although the terms "fuse" and/or "fusing" are used to describe the mechanical coupling of the powder particles, other mechanical actions, e.g., sintering, melting, and/or other electrical, mechanical, electromechanical, electrochemical, and/or chemical coupling methods are envisioned as being within the scope of the present disclosure.

PBF system 300 can also include a build floor 311 positioned within a powder bed receptacle. The walls of the powder bed receptacle 312 generally define the boundaries of the powder bed receptacle, which is sandwiched between the walls 312 from the side and abuts a portion of the build floor 311 below. Build floor 311 can progressively lower build plate 307 so that depositor 301 can deposit a next layer. The entire mechanism may reside in a chamber 313 that can enclose the other components, thereby protecting the equipment, enabling atmospheric and temperature regulation and mitigating contamination risks. Depositor 301 can include a hopper 315 that contains a powder 317, such as a metal powder, and a leveler 319 that can level the top of each layer of deposited powder.

Figure 3A:
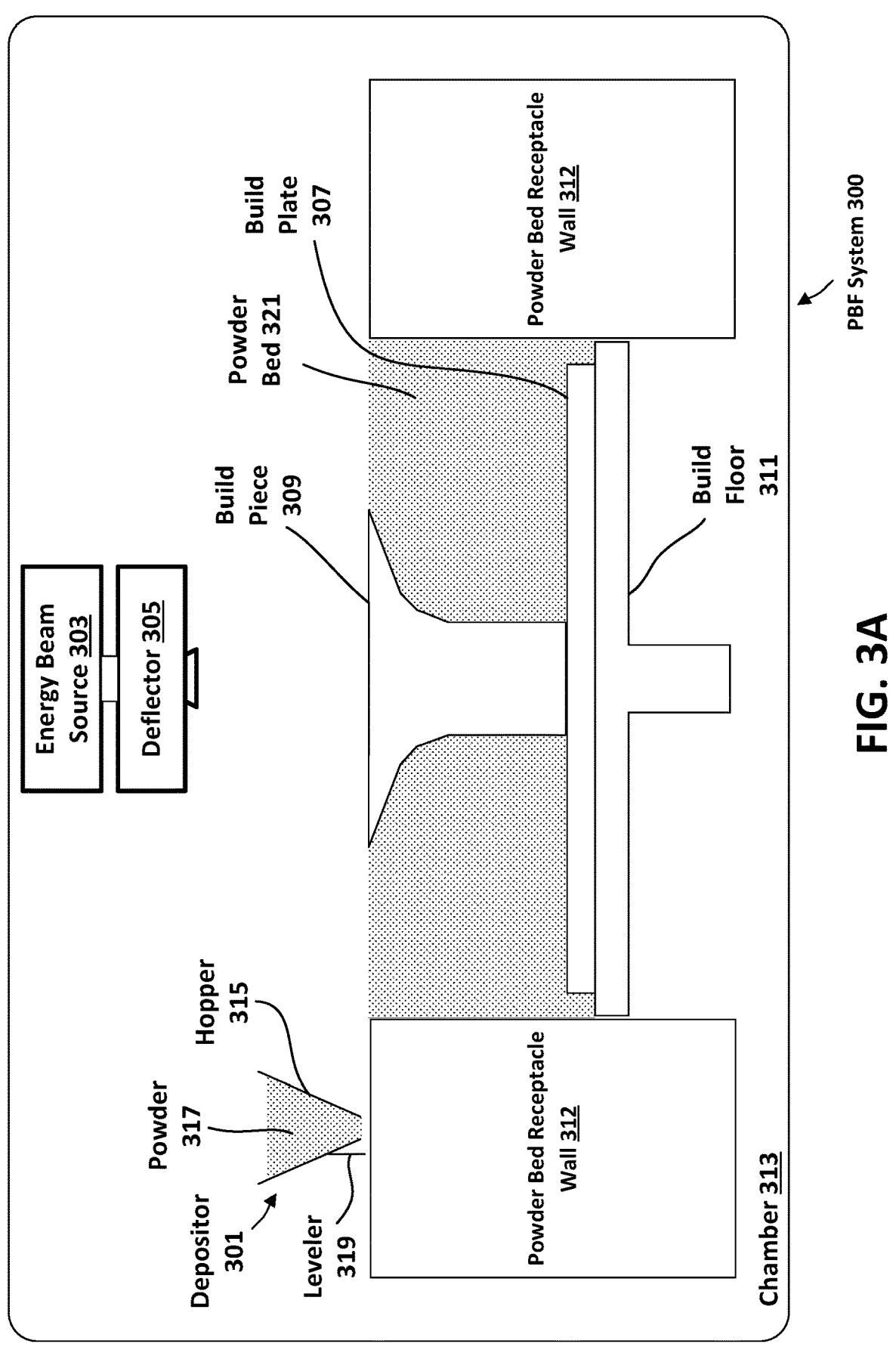
FIGS. 3A-3D illustrate respective side views of an exemplary PBF system during different stages of operation in accordance with an aspect of the present disclosure.

Referring specifically to FIG. 3A, this figure shows PBF system 300 after a slice of build piece 309 has been fused, but before the next layer of powder has been deposited. In fact, FIG. 3A illustrates a time at which PBF system 300 has already deposited and fused slices in multiple layers, e.g., 200 individual layers, to form the current state of build piece 309, e.g., formed of 200 individual slices. The multiple individual layers already deposited have created a powder bed 321, which includes powder that was deposited but not fused.

Figure 3B:
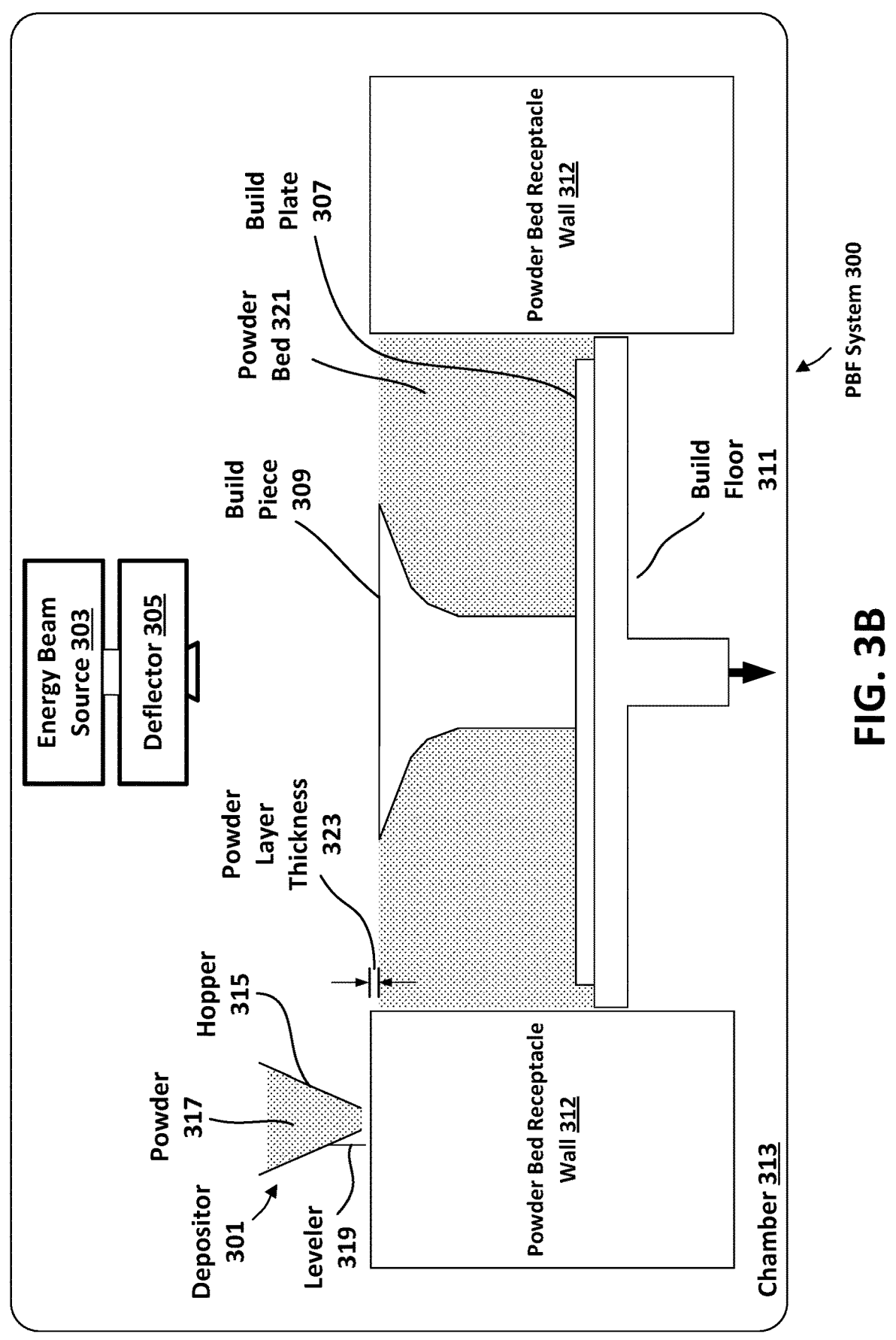

FIG. 3B shows PBF system 300 at a stage in which build floor 311 can lower by a powder layer thickness 323. The lowering of build floor 311 causes build piece 309 and powder bed 321 to drop by powder layer thickness 323, so that the top of build piece 309 and powder bed 321 are lower than the top of powder bed receptacle wall 112 by an amount equal to the powder layer thickness 323. In this way, for example, a space with a consistent thickness equal to powder layer thickness 323 can be created over the tops of build piece 309 and powder bed 321.

Figure 3C:
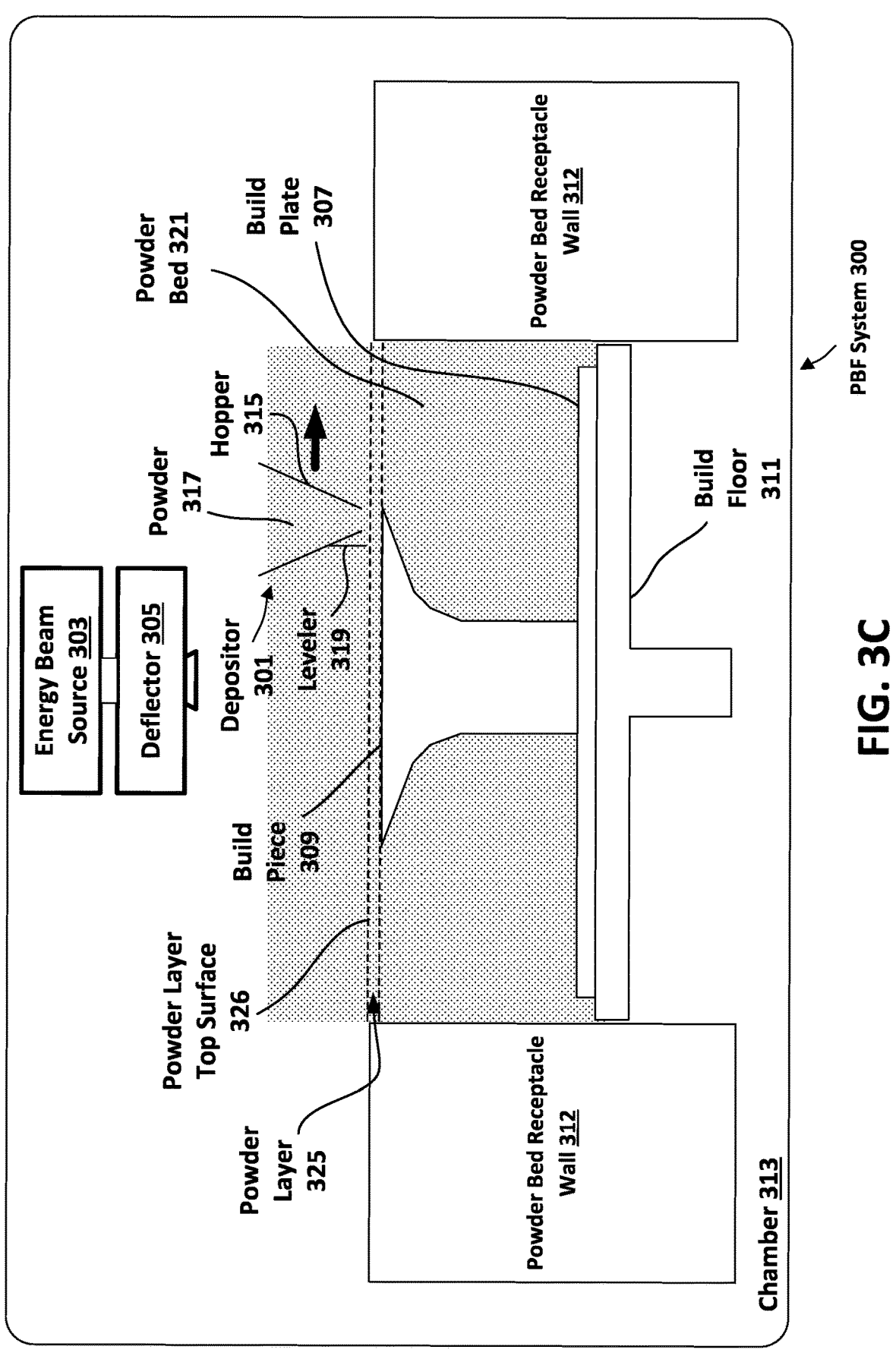

FIG. 3C shows PBF system 300 at a stage in which depositor 301 is positioned to deposit powder 317 in a space created over the top surfaces of build piece 309 and powder bed 321 and bounded by powder bed receptacle walls 312. In this example, depositor 301 progressively moves over the defined space while releasing powder 317 from hopper 315. Leveler 319 can level the released powder to form a powder layer 325 that leaves powder layer top surface 326 configured to receive fusing energy from energy beam source 303. Powder layer 325 has a thickness substantially equal to the powder layer thickness 323 (see FIG. 3B). Thus, the powder in a PBF system can be supported by a powder material support structure, which can include, for example, a build plate 307, a build floor 311, a build piece 309, walls 312, and the like. It should be noted that the illustrated thickness of powder layer 325 (i.e., powder layer thickness 323 (FIG. 3B)) is greater than an actual thickness used for the example involving the 200 previously-deposited individual layers discussed above with reference to FIG. 3A.

Figure 3D:
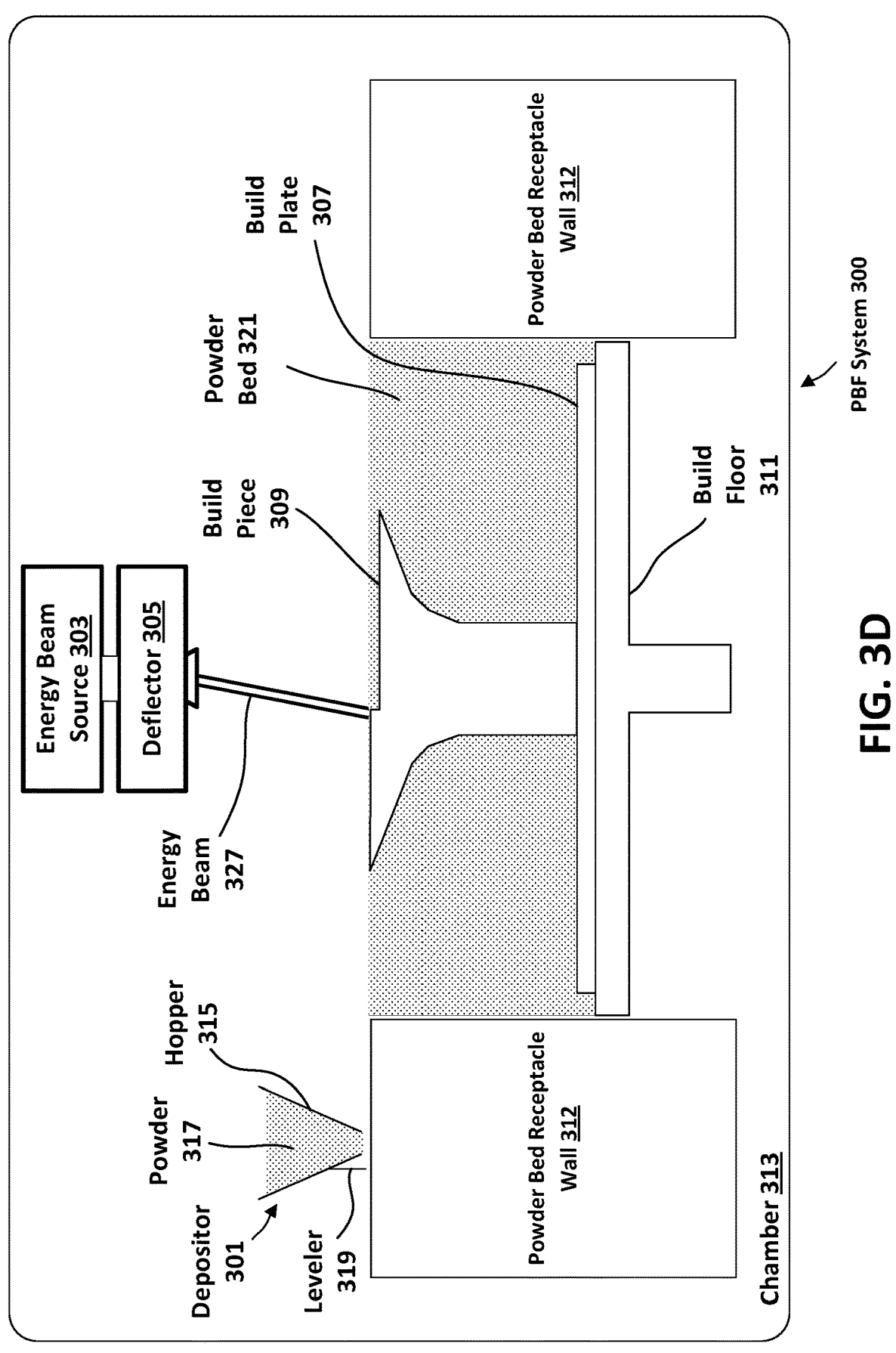

FIG. 3D shows PBF system 300 at a stage in which, following the deposition of powder layer 325 (FIG. 3C), energy beam source 303 generates an energy beam 327 and deflector 305 applies the energy beam to fuse the next slice in build piece 309. In various exemplary embodiments, energy beam source 303 can be an electron beam source, in which case energy beam 327 constitutes an electron beam. Deflector 305 can include deflection plates that can generate an electric field or a magnetic field that selectively deflects the electron beam to cause the electron beam to scan across areas designated to be fused. In various embodiments, energy beam source 303 can be a laser, in which case energy beam 327 is a laser beam. Deflector 305 can include an optical system that uses reflection and/or refraction to manipulate the laser beam to scan selected areas to be fused.

In various embodiments, the deflector 305 can include one or more gimbals and actuators that can rotate and/or translate the energy beam source to position the energy beam. In various embodiments, energy beam source 303 and/or deflector 305 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 3E:
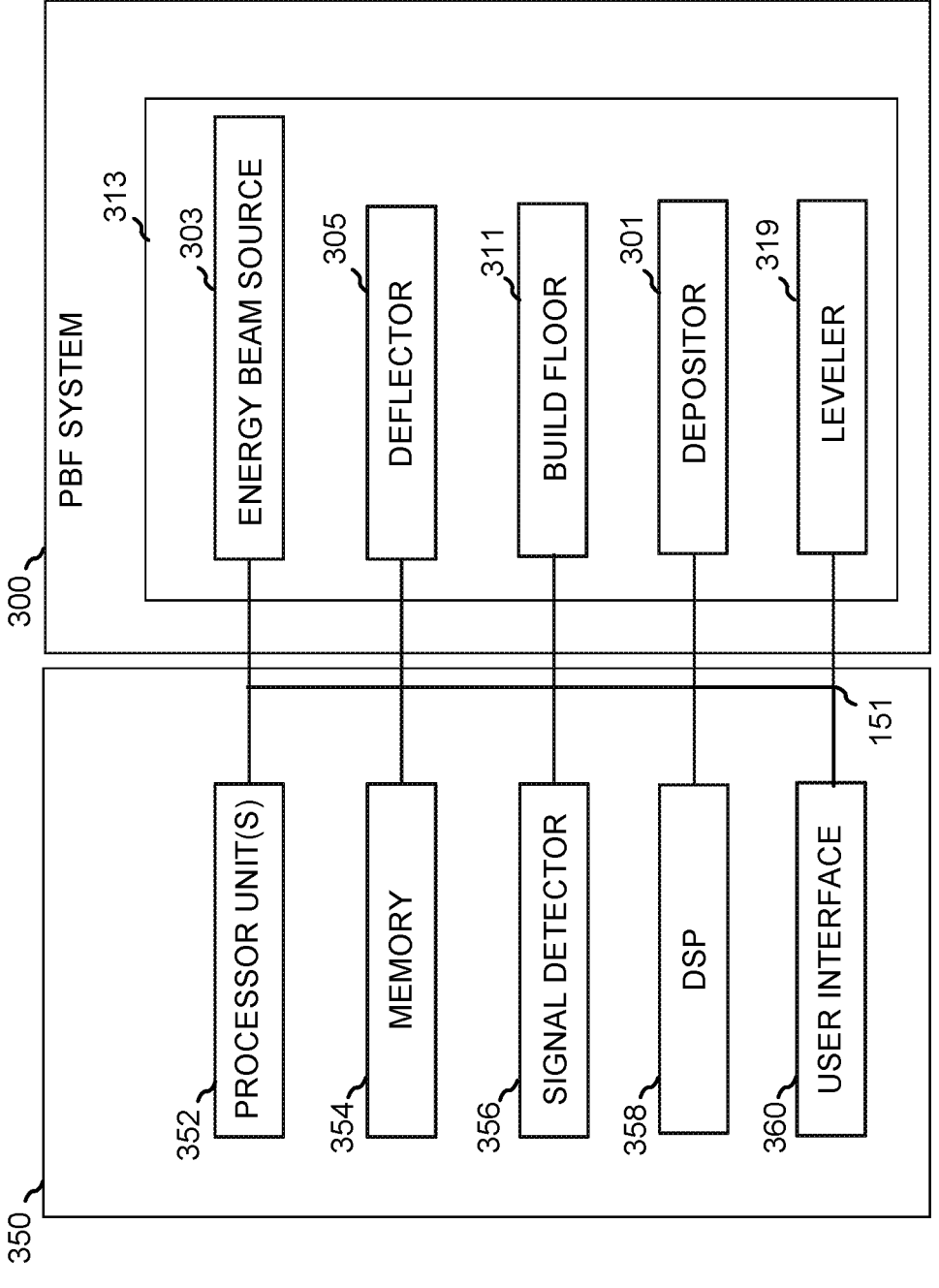
FIG. 3E illustrates a functional block diagram of a 3-D printer system in accordance with an aspect of the present disclosure.

FIG. 3E illustrates a functional block diagram of a 3-D printer system in accordance with an aspect of the present disclosure.

In an aspect of the present disclosure, control devices and/or elements, including computer software, may be coupled to PBF system 300 to control one or more components within PBF system 300. Such a device may be a computer 350, which may include one or more components that may assist in the control of PBF system 300. Computer 350 may communicate with a PBF system 300, and/or other AM systems, via one or more interfaces 351. The computer 350 and/or interface 351 are examples of devices that may be configured to implement the various methods described herein, that may assist in controlling PBF system 300 and/or other AM systems.

In an aspect of the present disclosure, computer 350 may comprise at least one processor unit 352, memory 354, signal detector 356, a digital signal processor (DSP) 358, and one or more user interfaces 360. Computer 350 may include additional components without departing from the scope of the present disclosure.

The computer 350 may include at least one processor unit 352, which may assist in the control and/or operation of PBF system 300. The processor unit 352 may also be referred to as a central processing unit (CPU). Memory 354, which may include both read-only memory (ROM) and random access memory (RAM), may provide instructions and/or data to the processor 304. A portion of the memory 354 may also include non-volatile random access memory (NVRAM). The processor 352 typically performs logical and arithmetic operations based on program instructions stored within the memory 354. The instructions in the memory 354 may be executable (by the processor unit 352, for example) to implement the methods described herein.

The processor unit 352 may comprise or be a component of a processing system implemented with one or more processors. The one or more processors may be implemented with any combination of general-purpose microprocessors, microcontrollers, digital signal processors (DSPs), floating point gate arrays (FPGAs), programmable logic devices (PLDs), controllers, state machines, gated logic, discrete hardware components, dedicated hardware finite state machines, or any other suitable entities that can perform calculations or other manipulations of information.

The processor unit 352 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, RS-274 instructions (G-code), numerical control (NC) programming language, and/or any other suitable format of code). The instructions, when executed by the one or more processors, cause the processing system to perform the various functions described herein.

The computer 350 may also include a signal detector 356 that may be used to detect and quantify any level of signals received by the computer 350 for use by the processing unit 352 and/or other components of the computer 350. The signal detector 156 may detect such signals as energy beam source 303 power, deflector 305 position, build floor 311 height, amount of powder 317 remaining in depositor 301, leveler 319 position, and other signals. Signal detector 356, in addition to or instead of processor unit 352 may also control other components as described with respect to the present disclosure. The computer 350 may also include a DSP 358 for use in processing signals received by the computer 350. The DSP 358 may be configured to generate instructions and/or packets of instructions for transmission to PBF system 300.

The computer 350 may further comprise a user interface 360 in some aspects. The user interface 360 may comprise a keypad, a pointing device, and/or a display. The user interface 360 may include any element or component that conveys information to a user of the computer 350 and/or receives input from the user.

The various components of the computer 350 may be coupled together by a bus system 351. The bus system 351 may include a data bus, for example, as well as a power bus, a control signal bus, and a status signal bus in addition to the data bus. Components of the computer 350 may be coupled together or accept or provide inputs to each other using some other mechanism.

Although a number of separate components are illustrated in FIG. 3E, one or more of the components may be combined or commonly implemented. For example, the processor unit 352 may be used to implement not only the functionality described above with respect to the processor unit 352, but also to implement the functionality described above with respect to the signal detector 356, the DSP 358, and/or the user interface 360. Further, each of the components illustrated in FIG. 3E may be implemented using a plurality of separate elements.

By way of example, an element, or any portion of an element, or any combination of elements may be implemented using one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors may execute software as that term is described above.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

Creating Complementary Topologies

Figure 4:
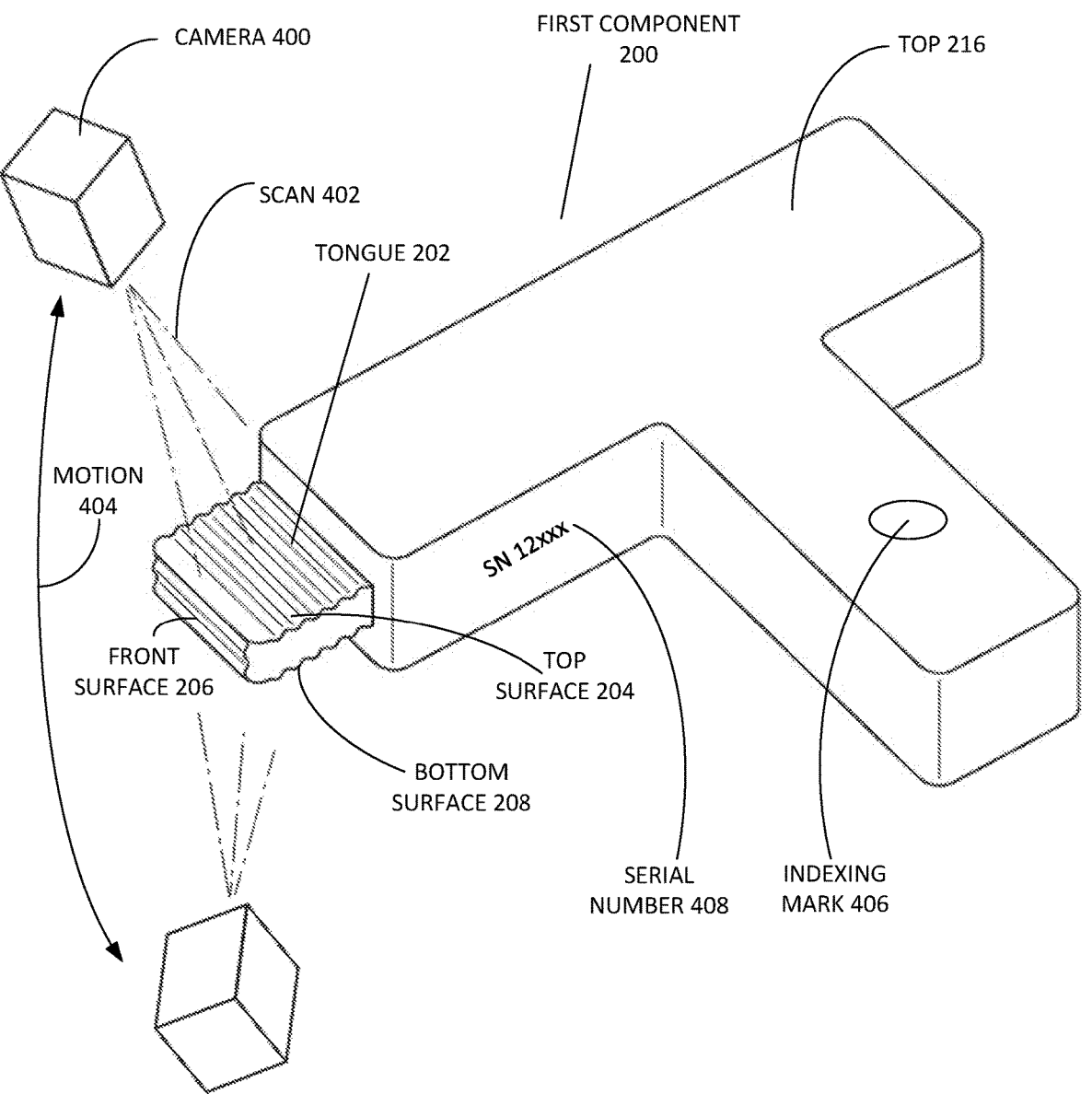
FIG. 4 illustrates a perspective view of a scanner scanning the additively-manufactured first component in accordance with an aspect of the present disclosure.

FIG. 4 illustrates a perspective view illustrating a scanner scanning the additively-manufactured first component in accordance with an aspect of the present disclosure.

First component 200 may be scanned by camera 400, and, in an aspect of the present disclosure, tongue 202 of first component may be scanned by camera 400 as shown by scan 402. Camera 400 may be coupled to one or more processors, such as processor(s) 352, in order to capture images of first component 200 and/or tongue 202 in memory 354.

In order to record details of one or more surfaces of first component 200 and/or tongue 202, e.g., top surface 204, front surface 206, bottom surface 208, etc., camera 400 and/or first component 200 may be moved, which may be illustrated as motion 404 shown in FIG. 4. Motion 404, whether performed by camera 400 and/or first component 200.

Scan 402 images the surface topology of one or more surfaces of first component 200, e.g., top surface 204, front surface 206, bottom surface 208, etc., such that any surfaces that may be used as part of an interface with another component are recorded and detailed. For example, and not by way of limitation, as shown in FIGS. 2 and 4, top surface 204, front surface 206, and bottom surface 208 are relatively rough compared to side surface 310 and side surface 312.

Further, top surface 204, front surface 206, and bottom surface 208, in the example of the present disclosure, are part of an interface with another component, while side surfaces 210 and 212 are not part of any interfaces. As such, camera 400, in an aspect of the present disclosure, may perform scan 402 of top surface 204, front surface 206, and bottom surface 208, but may not scan side surfaces 210 and 212.

In another aspect of the present disclosure, other portions of first component 200 may be included in scan 402. For example, and not by way of disclosure, first component 200 may have an indexing mark 406, serial number 408, or other feature that may be included in scan 402 taken by camera 400. In such an aspect, motion 404 may include additional axes, translations, and or rotations in order to include the desired portions of first component 200 in scan 402. In an aspect of the present disclosure, scan 402 may create a model of the surface topology, and may create a computer-aided model to be used to generate other surface topologies for other components.

In an aspect of the present disclosure, scan 402 may be used to evaluate the geometry of one or more surface profiles of first component 200. In an aspect of the present disclosure, scan 402 may also be used to provide printing instructions for another component in those areas where first component 200 and one or more other components interface. In such an aspect, printing dimensions of other components can be adjusted to more precisely interface with first component 200, e.g., determining a desired offset between tongue 202 and any corresponding groove structures. In an aspect of the present disclosure, features/portions of each component can be modeled and/or scanned as part of scan 402 to match various components together.

Scan 402 may image one or more surfaces of tongue 202 and generate a surface profile or topology of tongue 202 (and/or other portions of first component 200). Such images may be converted to computer instructions, e.g., g-code, that may be used as inputs for printing other components that may interface with tongue 202 and/or first component 200.

FIGS. 5A-5C illustrate perspective views of a complementary surface profile generated from the surface profile of the interface of the first component in accordance with an aspect of the present disclosure.

As shown in FIG. 5A, topology 500, which is created by scan 402 of tongue 202, comprises top surface 502, front surface 504, and bottom surface 506. In an aspect of the present disclosure, top surface 502 is a mating or "complementary" surface to top surface 204 of tongue 202, i.e., where top surface 204 has a raised portion, top surface 502 has a hollowed or dimpled portion such that top surface 204 and top surface 502 can mate together. Top surface 502 may be created in such a manner that a known and/or desired space or gap between top surface 502 and tongue 202 will exist when top surface 502 and top surface 204 are brought together in the interface between top surface 502 and top surface 204. For example, and not by way of limitation, a 1 millimeter (mm) gap may be designed into top surface 502 such that when topology 500 and tongue 202 are brought in proximity to form an interface, the 1 mm gap will exist between top surface 502 and top surface 204 of tongue 202.

Similarly, front surface 504 and bottom surface 506 are created by scan 402 of tongue 202, such that a complementary and/or mating surface for tongue 202 is described by topology 500. In an aspect of the present disclosure, gaps may be designed into any portion of topology 500 to allow for adhesive flow, spacing between topology 500 and tongue 202, and/or for other desired design reasons.

FIG. 5B illustrates a second component 508, having a groove 510, may be configured to be joined to tongue 202 of first component 200. As shown in FIG. 5B, groove 510 has smooth surfaces. Given the relatively rough topologies of top surface 204, front surface 206, and bottom surface 208 of tongue 202, a groove 510 having smooth surfaces that are to be mated to tongue 202 may not provide adequate mechanical support or be within tolerances for interfacing with tongue 202. In an aspect of the present disclosure, groove 502 will be customized to some degree by including topology 500 in the design and/or printing of second component 508.

In an aspect of the present disclosure, second component 508 can have a "generic" or standard design and/or specification, and may be manufactured through 3-D printing. In an aspect of the present disclosure, topology 500 may also be a "generic" or standard topology, and may be determined by averaging or measuring the topology of a number of tongues 202, and applying the generic topology 500 to second component 508. In another aspect of the present disclosure, topology 500 may be unique to a specific tongue 202 of a specific first component 200, which may create a unique pairing between a specific first component 200 and a specific second component 508. Any combination and/or permutation of these aspects of the present disclosure are possible within the scope of the present disclosure.

In an aspect of the present disclosure, second component 508 may be manufactured and/or printed using a higher-precision process or system, such as PBF system 300 described with respect to FIGS. 3A-3E. In such an aspect, the present disclosure allows for more precise mating of components manufactured using different printing technologies, some of which are higher speed, to enable higher throughput of components and assemblies.

FIG. 5C illustrates second component 508 manufactured with a profiled groove 512. As described above, profiled groove 512 may be unique to a specific second component 508, i.e., produced to mate to a specific tongue 202. Profiled groove 512 may also be a generic profile based on an average measurement of a number of tongues 202. In an aspect of the present disclosure, the design and instructions for manufacturing second component 508 may include instructions for producing profiled groove 512, either as a generic topology a unique topology, or as specified differences from a generic topology to an intermediate topology that is a blend of generic topology and unique topologies.

In an aspect of the present disclosure, a tongue 202, or a plurality of tongues 202, may be produced by a lower precision technique. Tongues 202, or a select portion of tongues 202 may be measured to determine a range of precision being produced by the lower precision technique, and such measurements or ranges may be used to generate one or more profiles for profiled groove 512.

In an aspect of the present disclosure, the specifications for a profiled groove 512 may be initially determined, and such specifications may be changed depending on characteristics of the mating tongue 202. For example, and not by way of limitation, a tongue 202 may be manufactured on a machine or with a technique that has a known range of precision, and the known range of precision may be used as inputs to the machine used to make profiled groove 512. Measurements of tongue 202 may be made, periodically or continuously, to adjust profiled groove 512, either per part that includes profiled groove 512, per "lot" or "batch" of parts that include profiled groove 512, or using other parameters. If the machine used to make tongue 202 changes, the precision of the new machine used for tongue 202 may be used as inputs to the machine used to make profiled groove 512, such that profiled groove 512 may better mate with tongue 202.

Figure 6:
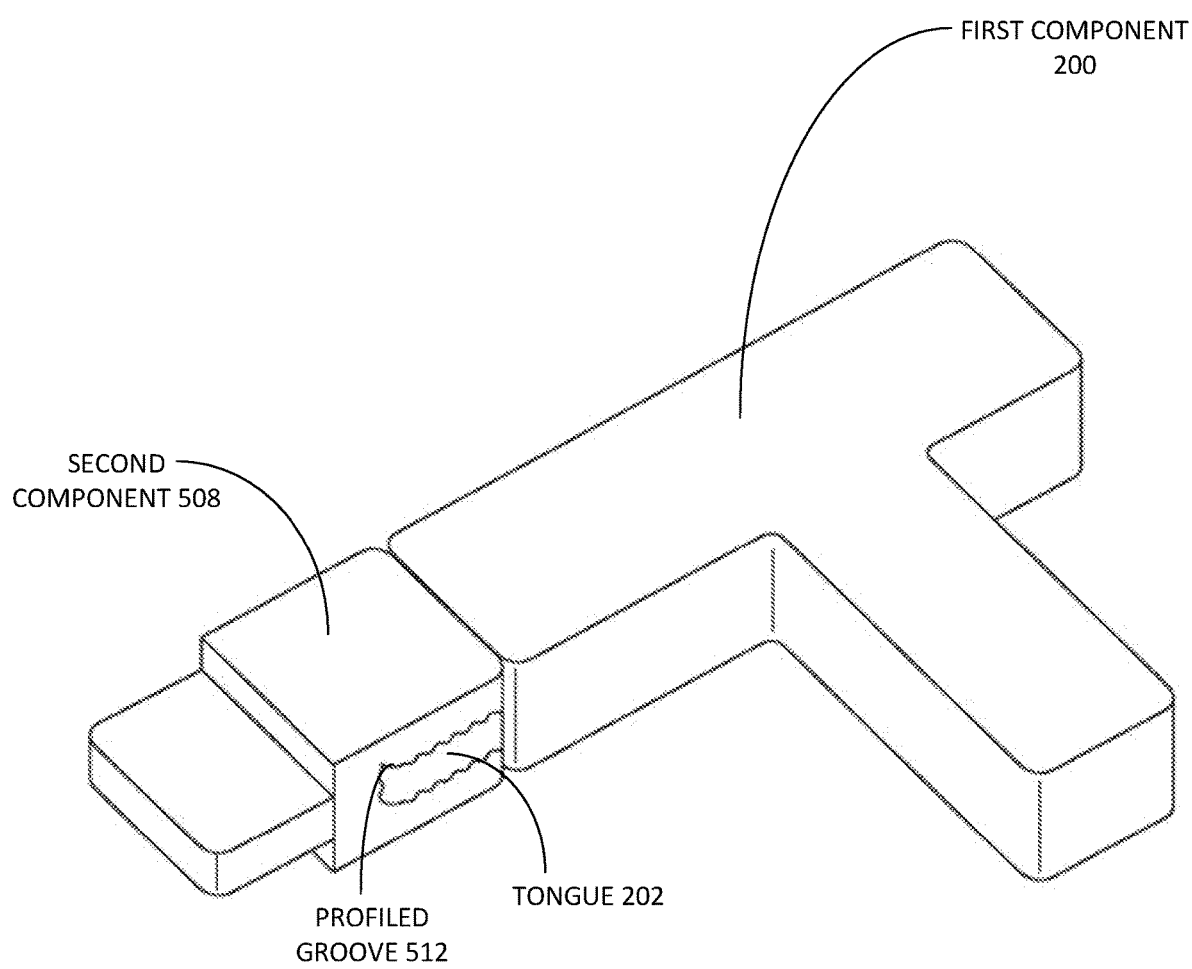
FIG. 6 illustrates a perspective view of an additively-manufactured first component connected to an additively manufactured second component in accordance with an aspect of the present disclosure.

FIG. 6 is a perspective view illustrating an additively-manufactured first component connected to an additively manufactured second component in accordance with an aspect of the present disclosure.

As shown in FIG. 6, tongue 202 of first component 200 is mated to profiled groove 512 of second component 508. Because scan 402 provided inputs to the manufacturing of second component 508, the interface between first component 200 and second component 508 can be manufactured to within desired tolerances throughout any portion or all of the mating surfaces of tongue 202 and profiled groove 512.

FIG. 7 illustrates a process for joining an additively-manufactured first component in accordance with an aspect of the present disclosure.

Process 700 includes block 702, which illustrates additively manufacturing a first component having an interface. Block 702 is illustrated at least by the process of FIG. 1, and by first component 200 and tongue 202 as described with respect to FIG. 2.

Block 704 illustrates generating a surface profile of the interface of the first component. Block 704 is illustrated at least by camera 400 and scan 402 described with respect to FIG. 4.

Block 706 illustrates generating a complementary surface profile from the surface profile of the interface of the first component. Block 706 is illustrated at least by topology 500 with respect to FIGS. 5A-5C.

Block 708 illustrates additively manufacturing a second component at a higher resolution than the first component with an interface having the complementary surface profile. Block 708 is illustrated at least by second component 508 having profiled groove 512 described with respect to FIG. 5C.

Advantages of the Present Disclosure

In an aspect of the disclosure, lower precision, higher throughput AM processes may be used in combination with a mainstream AM process, e.g., PBF, to produce a joint using DED without having to resort to costly and labor-intensive processes like machining. Other advantages may be obtained due to the ability to incorporate the complex features from the component into the interface.

In an aspect of the present disclosure, components made using different processes, including other AM processes, can be efficiently and durably combined. The use of AM in one component may help create a topology in another component that may assist in joining of the components such that the use of additional processes, such as machining or other modification techniques, may be reduced.

As discussed above, combining additively manufactured components provides the capability of joining a variety of components made of different materials. This provides greater customizability to meet a variety of needs when manufacturing a complex mechanical product. Such customizability reduces cost and manufacturing time. The combination of DED and PBF processes is one example of a configuration that can be generated by combining additively manufactured components.

For clarity, a substantially cubic/rectangular set of components is illustrated; however, a wide variety of shapes, sizes and configurations of components is possible depending on the nature of the component and the overall configuration. Further, for clarity, the internal structures that may be configured within the component are omitted from the illustration.

One skilled in the art will appreciate that the joint structure described with respect to FIG. 5 is simply an illustrative example of a structure that joins a first component with a second component and that variations to the components and techniques described may be used without departing from the scope of the invention.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A method for additively manufacturing components, comprising:

additively manufacturing a first component having a first interface at a first resolution as a tongue structure, wherein a top surface and a front surface of the first component is additively manufactured with rough surfaces such that a space or gap exists when the top surface of the first component and the front surface of the first component are coupled into a second interface of a second component to allow for adhesive flow;

scanning a surface profile of the interface of the first component;

generating a complementary surface profile from the scanned surface profile of the interface of the first component;

additively manufacturing the second component having a second interface as a groove structure, the second interface having a second resolution higher than the first resolution of the first interface of the first component, the second interface having the complementary surface profile; and configuring the groove structure to mate with the tongue structure to form the space or gap between the top surface of the first component and a front surface of the first component and the second interface of the second component.

2. The method of claim 1, further comprising additively manufacturing the first component using direct energy deposition.

3. The method of claim 1, further comprising additively manufacturing the second component using powder bed fusion.

4. The method of claim 1, further comprising scanning the surface profile of the interface of the first component using a three-dimensional scan.

5. The method of claim 1, further comprising generating a model from the surface profile of the interface of the first component.

6. The method of claim 1, further comprising generating the complementary surface profile by a computer-aided design model.

7. The method of claim 1, further comprising generating the complementary surface profile with an offset from the surface profile.

8. The method of claim 7, further comprising configuring the offset to accept an adhesive.

9. The method of claim 8, further comprising applying an adhesive to at least one of the surface profile and the complementary surface profile.

10. The method of claim 1, further comprising mating the first component and the second component.

* * * * *